United States Patent
Yahata

(10) Patent No.: US 11,151,693 B2
(45) Date of Patent: Oct. 19, 2021

(54) IMAGE PROCESSING APPARATUS AND IMAGE PROCESSING METHOD FOR NOISE REDUCTION

(71) Applicant: CANON KABUSHIKI KAISHA, Tokyo (JP)

(72) Inventor: Kazuhiro Yahata, Kunitachi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 186 days.

(21) Appl. No.: 16/048,894

(22) Filed: Jul. 30, 2018

(65) Prior Publication Data
US 2019/0043171 A1    Feb. 7, 2019

(30) Foreign Application Priority Data
Aug. 3, 2017    (JP) .............................. JP2017-150550

(51) Int. Cl.
*G06T 5/00* (2006.01)
*G06T 5/50* (2006.01)
*G06T 7/13* (2017.01)

(52) U.S. Cl.
CPC ............... *G06T 5/002* (2013.01); *G06T 5/50* (2013.01); *G06T 7/13* (2017.01); *G06T 2207/20192* (2013.01); *G06T 2207/20221* (2013.01)

(58) Field of Classification Search
CPC .. G06T 5/002; G06T 5/50; G06T 7/13; G06T 2207/20192; G06T 2207/20221
See application file for complete search history.

(56) References Cited

U.S. PATENT DOCUMENTS

| | | | |
|---|---|---|---|
| 5,031,224 A * | 7/1991 | Mengel | G06K 9/4647 382/155 |
| 8,301,220 B2 * | 10/2012 | Basterrechea | A61B 6/032 600/407 |
| 8,363,971 B2 * | 1/2013 | Sato | H04N 7/0132 382/254 |
| 2005/0100241 A1 * | 5/2005 | Kong | H04N 19/61 382/268 |
| 2005/0134730 A1 * | 6/2005 | Winger | H04N 7/012 348/448 |
| 2005/0139782 A1 * | 6/2005 | Nagahashi | G06K 9/00228 250/459.1 |

(Continued)

FOREIGN PATENT DOCUMENTS

| | | |
|---|---|---|
| EP | 3051485 A1 | 8/2016 |
| JP | 2010-114879 A | 5/2010 |
| JP | 2012-105091 A | 5/2012 |

*Primary Examiner* — Yubin Hung
(74) *Attorney, Agent, or Firm* — Canon U.S.A., Inc. IP Division

(57) ABSTRACT

An image processing apparatus configured to divide an image into frequency bands and reduce noise, in which a first image includes a high-band frequency component, and a second image includes a low-band frequency component, includes: a first detecting unit configured to detect an edge in at least one of the first image and the second image; a second detecting unit configured to detect a low-contrast edge that is of a lower contrast than a contrast of the edge detected by the first detecting unit in the at least one of the first image and the second image; a compositing unit configured to composite the first image and the second image using a weighting corresponding to the edge and the low-contrast edge.

14 Claims, 22 Drawing Sheets

(56) References Cited

U.S. PATENT DOCUMENTS

| | | |
|---|---|---|
| 2006/0245666 A1 | 11/2006 | Petrosyan |
| 2008/0192064 A1* | 8/2008 | Hong .................. G06T 5/40 345/582 |
| 2010/0066874 A1 | 3/2010 | Ishiga |
| 2010/0286525 A1 | 11/2010 | Osumi |
| 2011/0280494 A1 | 11/2011 | Da Rocha Leitao |
| 2012/0314946 A1* | 12/2012 | Nomura ............... G06T 5/002 382/167 |
| 2013/0097181 A1* | 4/2013 | Sud ..................... G06F 16/532 707/748 |
| 2016/0248984 A1* | 8/2016 | Li ........................ G06T 3/40 |

* cited by examiner

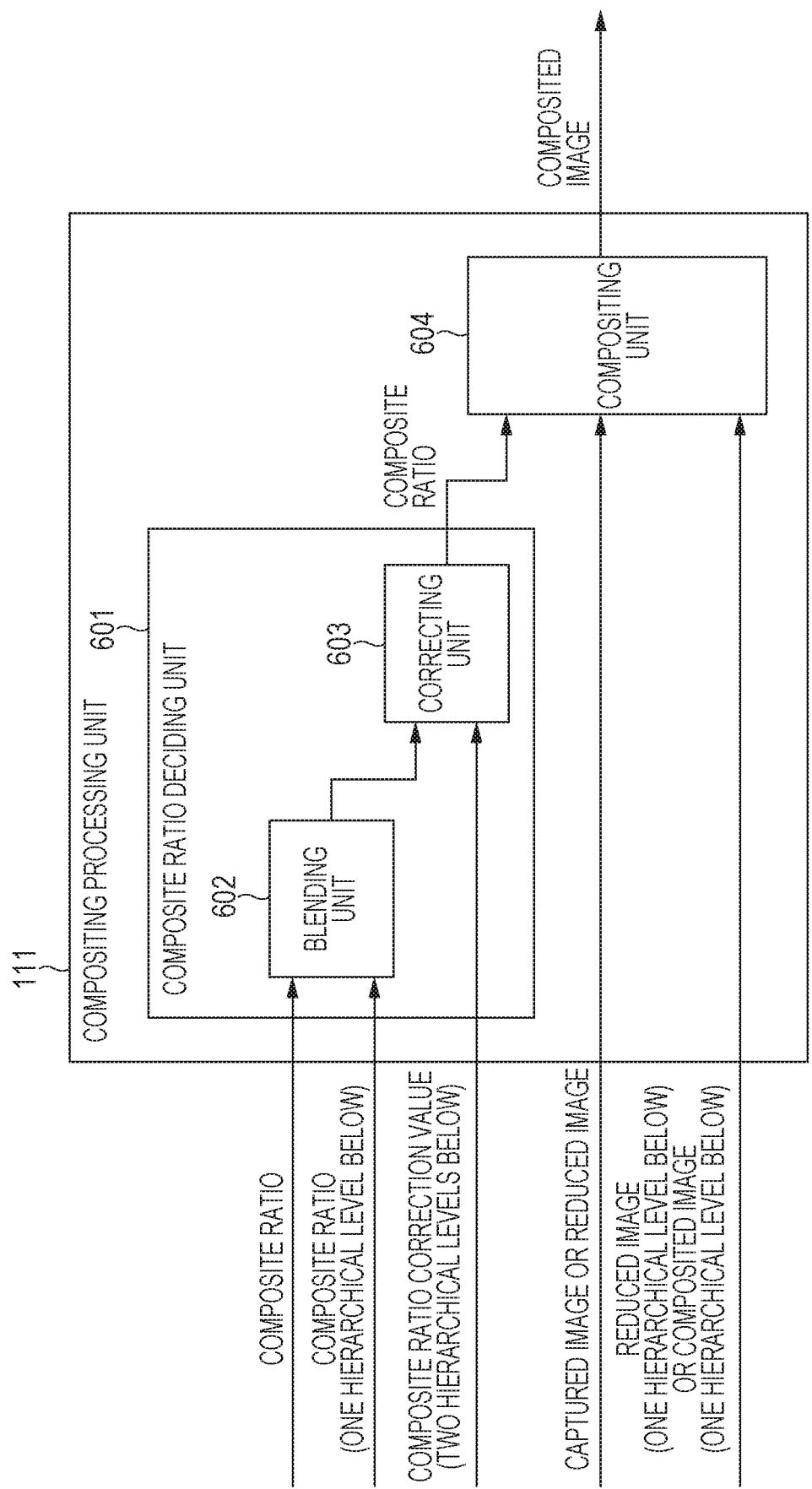

IMAGE PROCESSING APPARATUS AND IMAGE PROCESSING METHOD FOR NOISE REDUCTION

BACKGROUND OF THE INVENTION

Field of the Invention

The present invention relates to technology for reducing noise in captured images.

Description of the Related Art

There are many technologies known to reduce noise included in image data after photography, in order to reduce noise contained in images photographed with cameras. Japanese Patent Laid-Open No. 2012-105091 discloses a method for generating multiple reduced images with differing reduction ratios, and compositing high-resolution images and low-resolution images in accordance with edge detection results. The composite ratio of high-resolution image as to low-resolution image is set high for pixels determined to be in edge regions in high-resolution images, to suppress reduction in sharpness.

However, according to the method disclosed in Japanese Patent Laid-Open No. 2012-105091, edges and textures with low contrast are readily affected by noise, and accordingly there are cases where these are not detected as being edges, and the composite ratio of high-resolution image as to low-resolution image is undesirably set low. Consequently, edges and textures with low contrast become blurred.

SUMMARY OF THE INVENTION

It has been found desirable to detect low-contrast regions with high precision, thereby appropriately performing noise reduction processing on images including low-contrast regions.

An image processing apparatus configured to divide an image into frequency bands and reduce noise, in which a first image includes a high-band frequency component, and a second image includes a low-band frequency component, includes: a first detecting unit configured to detect an edge in at least one of the first image and the second image; a second detecting unit configured to detect a low-contrast edge that is of a lower contrast than a contrast of the edge detected by the first detecting unit in the at least one of the first image and the second image; a compositing unit configured to composite the first image and the second image using a weighting corresponding to the edge and the low-contrast edge.

Further features of the present invention will become apparent from the following description of exemplary embodiments with reference to the attached drawings.

BRIEF DESCRIPTION OF THE DRAWINGS

FIG. 3 is a diagram illustrating details of a composite processing unit in the image processing apparatus.

DESCRIPTION OF THE EMBODIMENTS

Embodiments of the present invention will be described below with reference to the attached drawings. Note that the configurations illustrated in the following embodiments are only exemplary, and that the present invention is not restricted to the illustrated configurations.

First Embodiment

An image processing apparatus that performs noise reduction processing by compositing multiple images, obtained by dividing an image into frequency bands, will be described. In a first embodiment, an input image is successively reduced to generate multiple reduced images, and the input image and multiple reduced images are composited, thereby reducing noise. The input image is an image including all frequency bands, and the greater the reduction ratio is (the greater the degree of reduction is, and smaller the number of pixels in the image obtained by reduction is), the more the image corresponds to low-band frequency components. Particularly, in the present embodiment, two images out of an input image and multiple reduced images are composited, based on low-contrast edges extracted from reduction images with higher reduction ratios. A region including a low-contrast edge is referred to as a "low-contrast region" here. Accordingly, an image processing apparatus is disclosed that is configured to divide an image into frequency bands and reduces noise, in which a first image includes a high-band frequency component, and a second image includes a low-band frequency component.

Figure 1A:
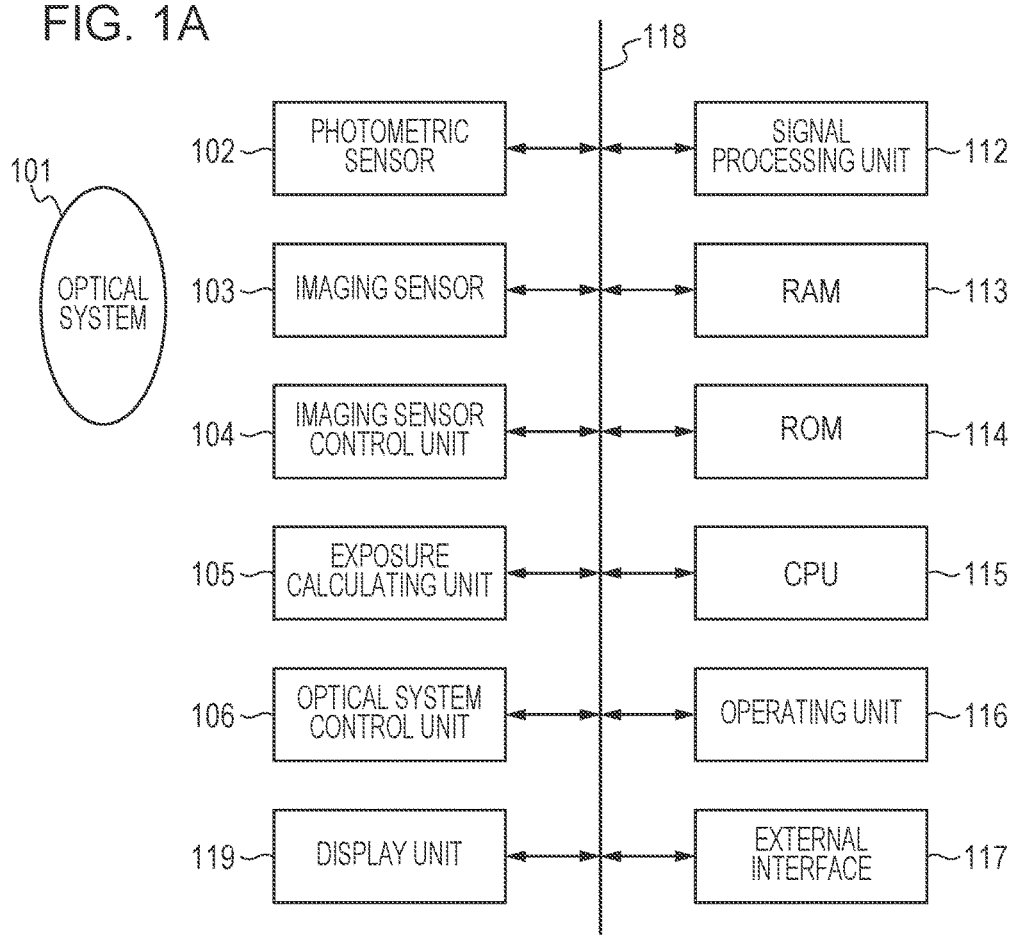
FIGS. 1A and 1B are block diagrams illustrating a hardware configuration and logical configuration of an image processing apparatus.

FIG. 1A illustrates the hardware configuration of the image processing apparatus according to the first embodiment. A configuration example of a digital camera is illustrated here, as an example of the image processing apparatus. The image processing apparatus includes an optical system 101, a photometric sensor 102, an imaging sensor 103, an imaging sensor control unit 104, an exposure calculating unit 105, and an optical system control unit 106. The image processing apparatus further includes a reduced image generating unit 107, an edge detection unit 108, a composite ratio deriving unit 109, a composite ratio correction value deriving unit 110, a compositing processing unit 111, and a signal processing unit 112. The image processing apparatus further includes random access memory (RAM) 113, read-only memory (ROM 114), a central processing unit (CPU) 115, an operating unit 116, a display unit 119, an external interface 117, and a main bus 118.

The CPU 115 controls the configurations following input images and later-described programs. The ROM 114 stores computer programs for the CPU 115 to execute the various types of configurations. The RAM is used as buffer memory that temporarily stores image data obtained by shooting, via the imaging sensor 103 and so forth, and as work area of the CPU 115, and so forth. The CPU 115 interprets a program recorded in the ROM 114, and the image processing apparatus performs operations based on commands. The display unit 119 displays viewfinder images when taking images, and images that have been captured. The operating unit 116 includes operating members, such as a button that the user uses to instruct the image processing apparatus to perform shooting, a reproducing button for displaying images on the display unit 119, and so forth. A configuration may also be made where the display unit 119 for displaying images functions as a touch panel, and user instructions are input via the display unit 119. In this case, the display unit 119 displays a user interface (UI) for the user to input desired instructions. The external interface 117 is an interface for connecting the image processing apparatus with an external device. The external interface 117 may be configured to exchange data is a communication device using infrared communication or a wireless local area network (LAN) or the like. The configurations are connected by the main bus 118.

The user sets the state of the image processing apparatus via the display unit 119 and the operating unit 116, and gives instructions for operations. Examples of operations include a preliminary exposure operation, main imaging, and so forth. When the user directs the image processing apparatus toward a subject and issues an instruction for preliminary exposure by operating the operating unit 116, the CPU 115 detects this instruction, and performs the preliminary exposure operation as programmed beforehand. In the preliminary exposure operation, the photometric sensor 102 detects the amount of light from the subject, and the CPU 115 drives the exposure calculating unit 105 based on this amount of light to calculate the exposure, and sets the exposure of the imaging sensor 103 via the imaging sensor control unit 104. The CPU 115 also evaluates focus regarding the subject, based on the amount of light from the subject that the imaging sensor 103 has detected, and drives the optical system 101 via the optical system control unit 106 to perform focusing. When the user instructs main imaging via the operating unit 116, the CPU 115 detects this instruction, and starts the series of imaging operations. First, the imaging sensor 103 performs exposure, and the imaging sensor 103 converts the amount of light received into digital signals. The digital signals, to which light has been converted at the imaging sensor 103, is subjected to processing as appropriate at the signal processing unit 112, and then temporarily stored in the RAM 113 as an image. Noise reduction processing is executed on an input image obtained in this way in the image processing apparatus according to the present embodiment.

Figure 1B:
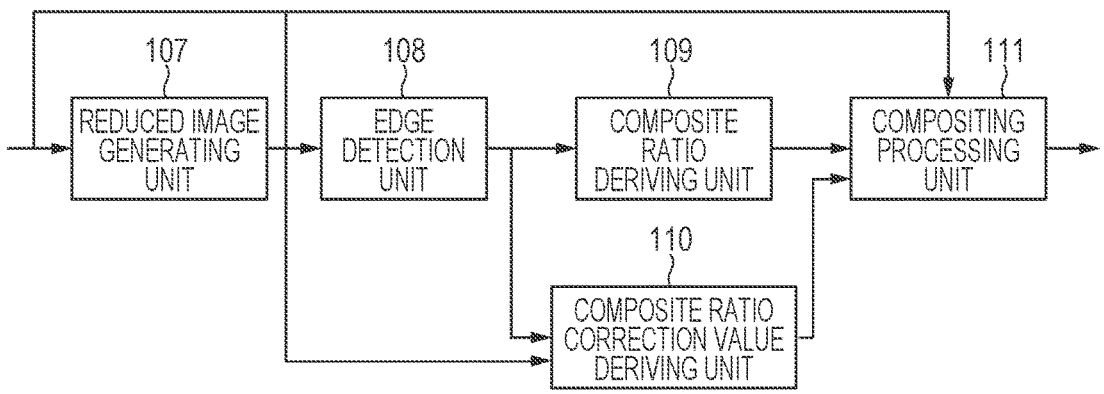
Figure 2A:
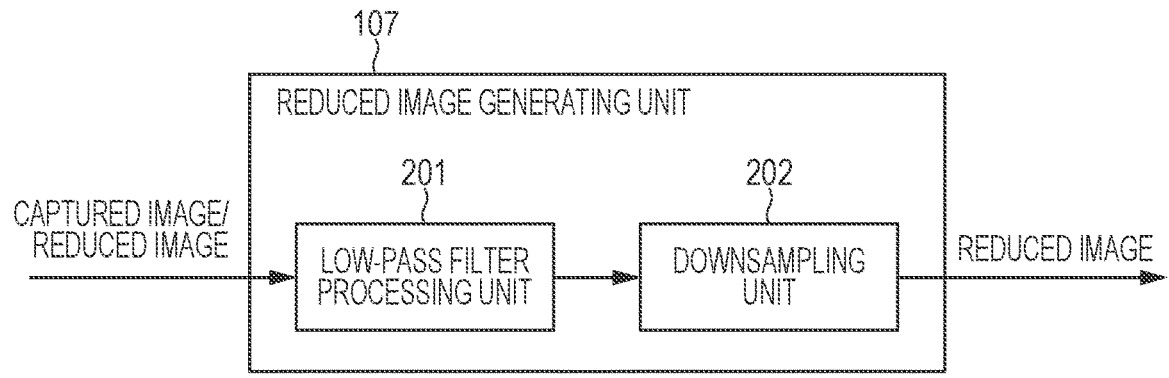
FIGS. 2A through 2C are diagrams illustrating logical configurations of components of the image processing apparatus in detail, FIG. 2A illustrating a reduced image generating unit, FIG. 2B an edge detecting unit, and FIG. 2C a composite ratio correction value deriving unit.

FIG. 1B is a block diagram illustrating a logical configuration for executing noise reduction processing in the image processing apparatus. The CPU 115 realizes the configurations by running software stored in the ROM 114. The reduced image generating unit 107 reads in the input image obtained by imaging from the RAM 113, and generates multiple reduced images with different reduction ratios. FIG. 2A is a block diagram illustrating a detailed configuration of the reduced image generating unit 107. The reduced image generating unit 107 is made up of a low-pass filter processing unit 201 and a downsampling unit 202.

The reduced image generating unit 107 generates a first reduced image by reducing the input image, and records this in the RAM 113. The reduced image generating unit 107 then reads in the first reduced image and further reduces this to generate a second reduced image, and stores this in the RAM 113. In detail, in the reduction processing, the low-pass filter processing unit 201 first applies a low-pass filter to the input image or reduced image. A commonly-used low-pass filter, which is used for antialiasing, is used here for pre-processing for the reduction processing. The downsampling unit 202 generates a reduced image by reducing the number of pixels by thinning out the pixels with regard to the image after low-pass processing. Thereafter, this processing is repeated for a predetermined number of times, thereby generating Nmax reduced images. The reduction processing is performed four times here, generating four (Nmax=4) reduced images. In the present embodiment, the second reduced image is an image that is further reduced as compared to the first reduced image, which also is the same for the third reduced image as to the second reduced image, and the fourth reduced image as to the third reduced image. Accordingly, a third image is disclosed that includes a low-band frequency component that is lower than the low-band frequency component of the second image. Similarly, a fourth image is disclosed that includes a low-band frequency component that is lower than the low-band frequency component of the third image. In the following description, the input image will be also referred to as a "highest hierarchical level image", and images with a smaller reduction ratio are at a higher hierarchical level, while the greater the reduction ratio of images is, the lower the hierarchical level is. That is to say, the lower the hierarchical level of an image is, the less high-frequency component is contained, and thus the more this image corresponds to low-band frequency components as compared to other images.

Figure 2B:
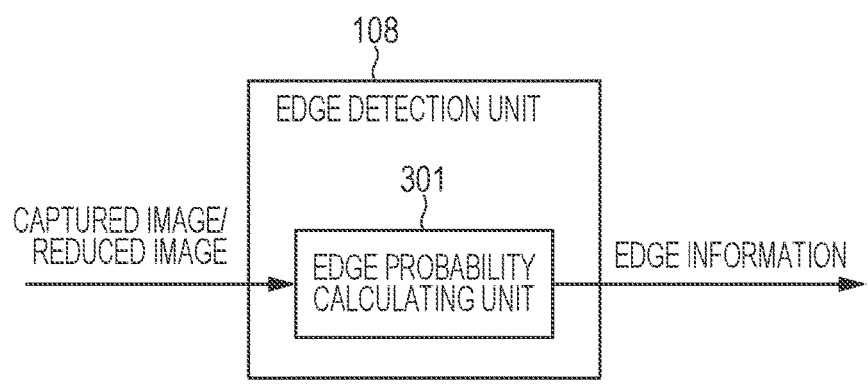

The edge detection unit 108 performs edge detection on the input image and each of the first through Nmax−1'th reduced images. The edge detection unit 108 does not perform edge detection regarding the Nmax'th reduced image that has been reduced the most. FIG. 2B is a diagram illustrating details of the edge detection unit 108. The edge detection unit 108 detects edge probability for each pixel in an image that is the object of processing, and outputs as edge information for each pixel. This edge probability is an index value that assumes a large value when the probability that a pixel of interest is a pixel making up an edge is high. The sum of absolute values of horizontal-direction and vertical-direction differentials is calculated as the edge probability.

The composite ratio deriving unit 109 calculates a composite ratio at the edge region, based on the edge probability obtained as a result of detection by the edge detection unit 108. The composite ratio is used for compositing an N'th reduced image and an N+1'th reduced image in increments of pixels. Note that N is an integer from 0 through Nmax, where N=0 means that the 0'th reduced image is the input image that has not been reduced. The N+1'th reduced image has a higher reduction ratio, as described above. Accordingly, the N+1'th reduced image has higher noise reduction effects as compared to the N'th reduced image. In the other hand, the edges of the N+1'th reduced image are more blurred as compared to the N'th reduced image. Accordingly, in a case where the edge probability of a pixel of interest is great and the probability of being an edge is high, the composite ratio deriving unit 109 derives the composite ratio such that the weight of the N'th reduced image with the smaller reduction ratio is greater. On the other hand, in a case where the edge probability of the pixel of interest is small and the probability of being a smooth portion is high, the composite ratio deriving unit 109 derives the composite ratio such that the weight of the N'th reduced image with the smaller reduction ratio is smaller.

Figure 2C:
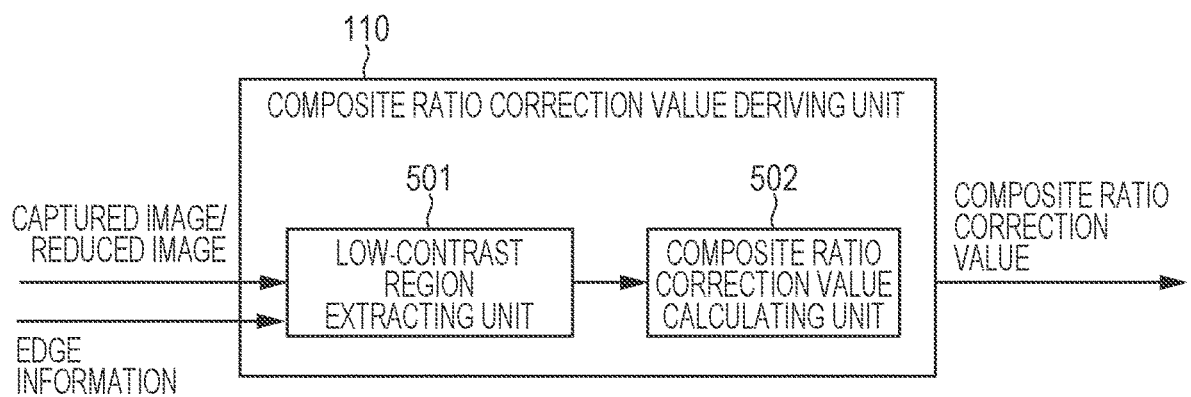

The composite ratio correction value deriving unit 110 extracts a low-contrast region including a low-contrast edge from a reduced image, and calculates a composite ratio correction value for correcting the composite ratio of a pixel included in a low-contrast region. FIG. 2C is a diagram illustrating the composite ratio correction value deriving unit 110 in detail. A low-contrast region extracting unit 501 calculates a score for each pixel for determining whether or not there is a low-contrast edge in an image with a higher reduction ratio than a reduced image where an edge has been detected. Edges and textures in low-contrast regions are readily affected by noise, and analysis by the edge detection unit 108 may result in determination that the probability that the pixel of interest is a smooth portion is high. Consequently, the composite ratio may be derived for the low-contrast region so that the high reduction ratio N+1'th reduced image has a greater weighting. Accordingly, with regard to regions where low-contrast edges are present, the composite ratio correction value calculating unit 502 calculates a correction value of the composite ratio, so that the weighting of the N'th reduced image that has a higher hierarchical level and has better sharpness has a greater weighting. The correction value for the composite ratio in smooth regions, and in high-contrast edges and textures is calculated to be approximately zero. A specific calculation method of scores and composite ratio correction values will be described later.

The compositing processing unit 111 composites the input images and the Nmax reduced images in increments of pixels, based on the composite ratio derived by the composite ratio deriving unit 109 and the composite ratio correction value derived by the composite ratio correction value deriving unit 110. First, the compositing processing unit 111 here composites the Nmax'th reduced image that has been reduced the most, and the Nmax−1'th reduced image that is one hierarchical level above. The composited image is updated as the Nmax−1'th reduced image, and is composted with the reduced image one hierarchical level above. This processing is repeated until reaching the input image, and the one composited image is output to the signal processing unit 112 as a noise-reduced image. FIG. 3 illustrates the compositing processing unit 111 in detail. The compositing processing unit 111 is made up of a composite ratio deciding unit 601 and a compositing unit 604. The composite ratio deciding unit 601 further includes a blending unit 602 and a correcting unit 603. At the time of compositing the N'th reduced image and the N+1'th reduced image, the blending unit 602 blends the composite ratio derived based on the edge detection results of each of the N'th reduced image and N+1'th reduced image with the composite ratio one hierarchical level below. The correcting unit 603 corrects the composite ratio blended by the blending unit 602 using the composite ratio correction value. Note however, that the correcting unit 603 uses the composite ratio correction value derived based on the reduced image one hierarchical level below the two reduced images being composited. For example, at a hierarchical level where the input image and first reduced image are being composited, the composite ratio derived based on edge detection results of the input image and the composite ratio derived based on the first reduced image are blended. The blended composite ratio is then corrected, using the composite ratio correction value derived based on the results of detection of low-contrast regions in the second reduced image. The compositing unit 604 composites the two images input to the correcting unit 603, using the composite ratio corrected by the correcting unit 603.

Figure 4:
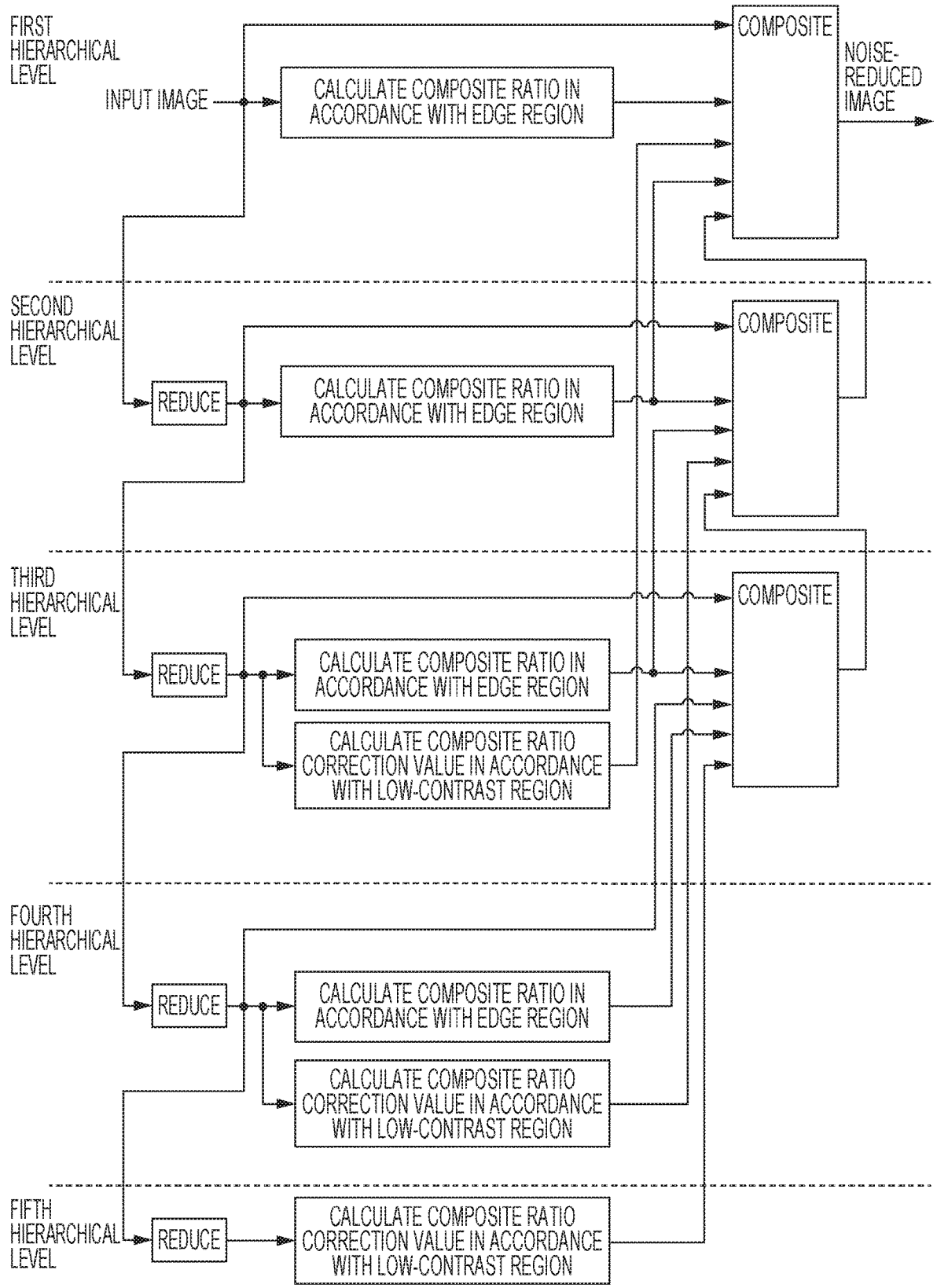
FIG. 4 is a diagram for describing an overall image of noise reduction processing according to a first embodiment.

Now, FIG. 4 is a schematic diagram for describing the overall image of noise reduction processing according to the first embodiment. An input image is successively reduced and four reduced images are generated, so the processing is performed in five hierarchical levels. At the third hierarchical level, the composite ratio is decided based on the composite ratio corresponding to edges in the second reduced image, the composite ratio corresponding to edges in the third reduced image, and the composite ratio correction value corresponding to low-contrast regions in the fourth reduced image that has been reduced the farthest. The second reduced image and third reduced image are composited at the third hierarchical level. At the second hierarchical level, the composite ratio is decided based on the composite ratio corresponding to edges in the first reduced image, the composite ratio corresponding to edges in the second reduced image, and the composite ratio correction value corresponding to low-contrast regions in the third reduced image. The first reduced image and the composited image generated by compositing processing at the third hierarchical level are composited at the second hierarchical level. At the first hierarchical level, the composite ratio is decided based on the composite ratio corresponding to edges in the input image, the composite ratio corresponding to edges in the first reduced image, and the composite ratio correction value corresponding to low-contrast regions in the second reduced image. The input image and the composited image generated by compositing processing in the second hierarchical level are composited in the third hierarchical level. No inter-image compositing processing is performed at the fourth hierarchical level or fifth hierarchical level. Only deriving of the composite ratio correction value for the third hierarchical level is performed at the fifth hierarchical level.

Detection of low-contrast regions by the composite ratio correction value deriving unit 110 and the composite ratio correction value will be described in detail next. The features of smooth regions, low-contrast region, and high-contrast regions will each be considered. In a case where a pixel of interest is a pixel in a smooth region, there is only slight dispersion in pixel values occurring due to the effects of noise. Accordingly, there is little local variance of the pixel of interest in smooth regions. On the other hand, in a case where the pixel of interest is a region including edge portions or texture with high contrast, local variance is greater. In a case where a pixel of interest is a low-contrast region, the local variance is greater than noise variance generated by noise, and smaller than local variance of the high-contrast regions. Accordingly, in the present embodiment, variance is calculated in local regions near the pixel of interest, and detected as low-contrast regions in a case where local variance is mid-level.

Expression (1) shows a low-contrast score that the low-contrast region extracting unit 501 calculates $$L(x,y)=T(V(x,y))$$

$$V(x,y)=\text{Var}(I(x,y)) \ldots \quad (1)$$

where x and y represent coordinates indicating a position on the image, $V(x,y)$ is a value defined by Expression (1), and $\text{Var}(I(x,y))$ is local variance in a region near a pixel of interest $(x,y)$ in image $I(x,y)$, e.g., a 5-pixel×5-pixel region.

$$L(x,y) \equiv T(V(x,y))$$

$$V(x,y) \equiv \text{Var}(I(x,y)) \quad (1)$$

where x and y represent coordinates indicating a position on the image, $V(x,y)$ is a volume defined by Expression (1), and $\text{Var}(I(x,y))$ is local variance in a region near a pixel of interest $(x,y)$ in image $I(x,y)$, e.g., a 5-pixel×5-pixel region.

Figure 5:
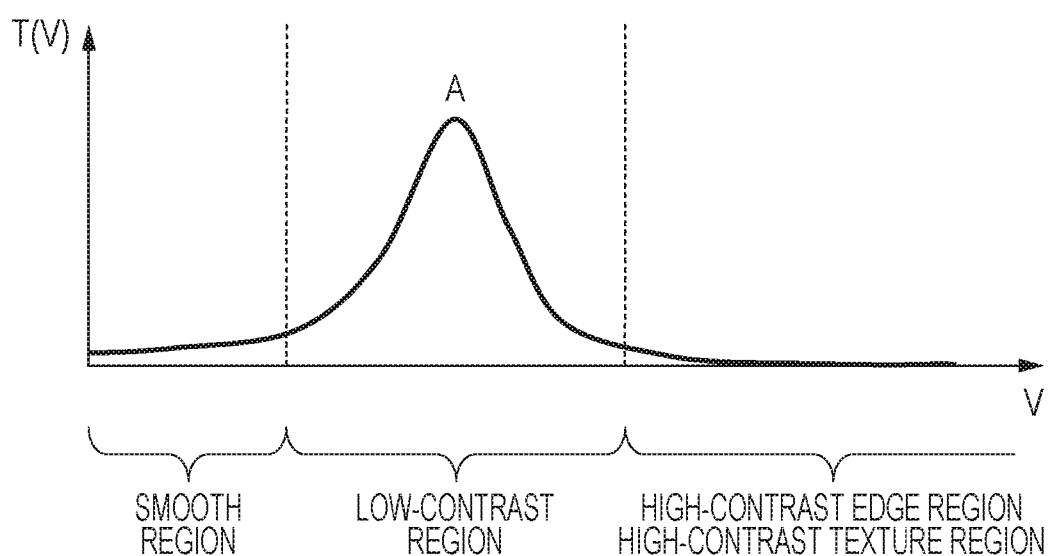
FIG. 5 is a diagram illustrating an outline of a function flow calculating a low-contrast score.

The low-contrast region extracting unit 501 further uses a function $T(z)$ to convert local variance of the pixel of interest into a low-contrast score $L(x,y)$. FIG. 5 is a diagram illustrating the function $T(z)$. The low-contrast score $L(x,y)$ has a characteristic of initially increasing as the local variance $V(x,y)$ increases, reaching the greatest value at point A, then reversing the trend to decrease and finally reaching zero or approximating zero. That is to say, the low-contrast score $L(x,y)$ has a characteristic of having a large value where the local variance $V(x,y)$ is neither large nor small. Thus, the low-contrast region extracting unit 501 can obtain the low-contrast score $L(x,y)$ having a large value only in low-contrast regions, by using the function T corresponding to the local variance $V(x,y)$.

The composite ratio correction value calculating unit 502 calculates the composite ratio correction value for correcting the composite ratio, so that the higher hierarchical level that has better sharpness in the low-contrast region is weighted heavier. The low-contrast score assumes a large value in a low-contrast region in the present embodiment. Accordingly, the composite ratio correction value calculating unit 502 multiples the low-contrast score $L(x,y)$ by a coefficient k, and outputs as a composite ratio correction value. With the maximum value of the function T as Tmax, the coefficient k is 0.5/Tmax in the present embodiment. The composite ratio correction value where the low-contrast score $L(x,y)$ has been multiplied by the coefficient k preferably is a value of 1 or smaller, taking into consideration the effect of the low-contrast score on the composite ratio. However, the value of the coefficient k is not necessarily restricted to this example, and is to be set as appropriate. Although an arrangement has been described where the composite ratio correction value deriving unit 110 calculates the low-contrast score $L(x,y)$ and thereafter multiples by the coefficient to obtain the composite ratio correction value, but a configuration may be made where the coefficient is embedded in the function T, so the low-contrast score is used as the composite ratio correction value as it is. In order to correct the composite ratio in a spatially smooth manner, it is preferable to apply a spatial filter to the low-contrast score, and thereafter multiple by a suitable coefficient.

The flow of noise reduction processing according to the present embodiment will be described with reference to the flowcharts illustrated in FIGS. 6 through 10. The CPU 115 sequentially reads out and executes programs for realizing FIGS. 6 through 10.

Figure 6:
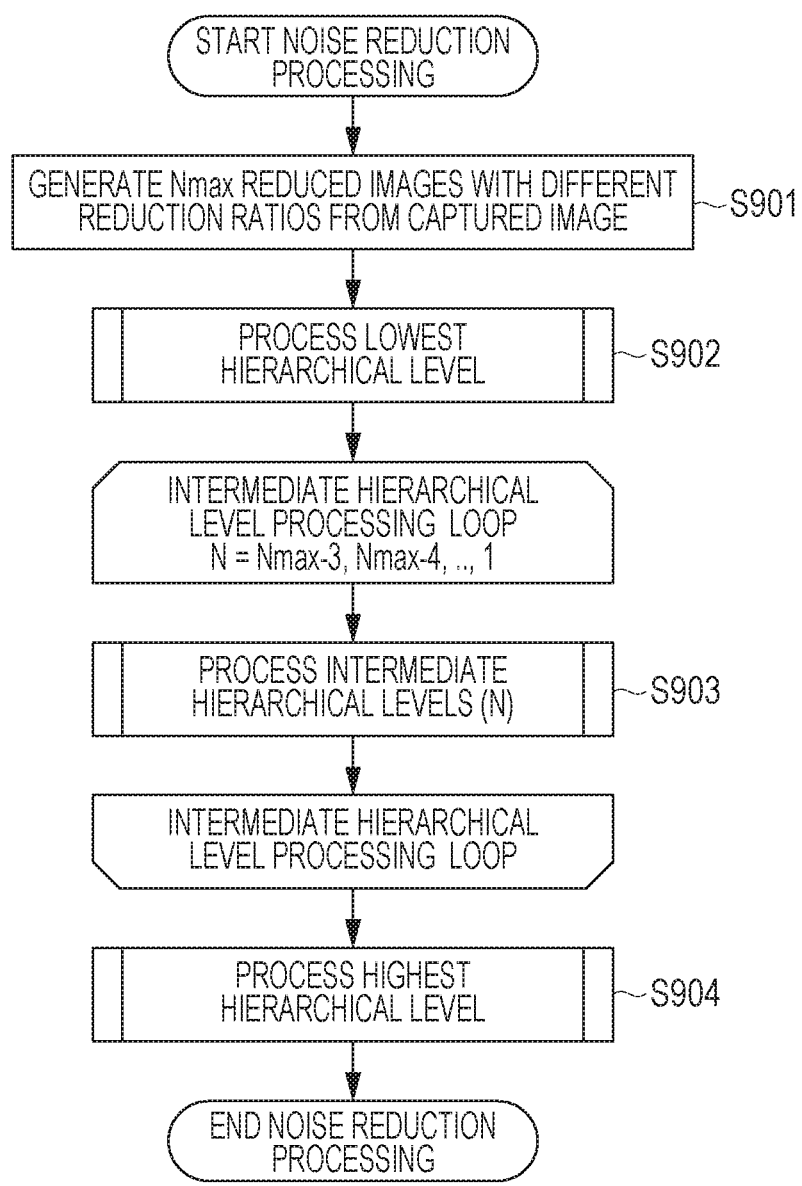
FIG. 6 is a flowchart of the overall noise reduction processing.

FIG. 6 is a flowchart illustrating the overall noise reduction processing. In step S901, the reduced image generating unit 107 generates Nmax reduced images with different reduction ratios, from an input image obtained by photographing. Nmax=4 in the present embodiment. The noise reduction processing advances from the lower hierarchical levels toward the higher hierarchical levels. In step S902, processing of the lowest hierarchical level is performed. Details of the processing in step S902 will be described later with reference to FIG. 7. Step S902 includes up to performing of the first compositing processing (the compositing processing at the third hierarchical level in FIG. 4). Next, processing of intermediate hierarchical levels is performed in step S903. This processing is repeated at each hierarchical level until reaching the second hierarchical level. Note however, in the case of the present embodiment, this is performed just once. Finally, processing of the highest hierarchical level is performed in step S904, a noise-reduced image is generated, and the processing ends.

Figure 7:
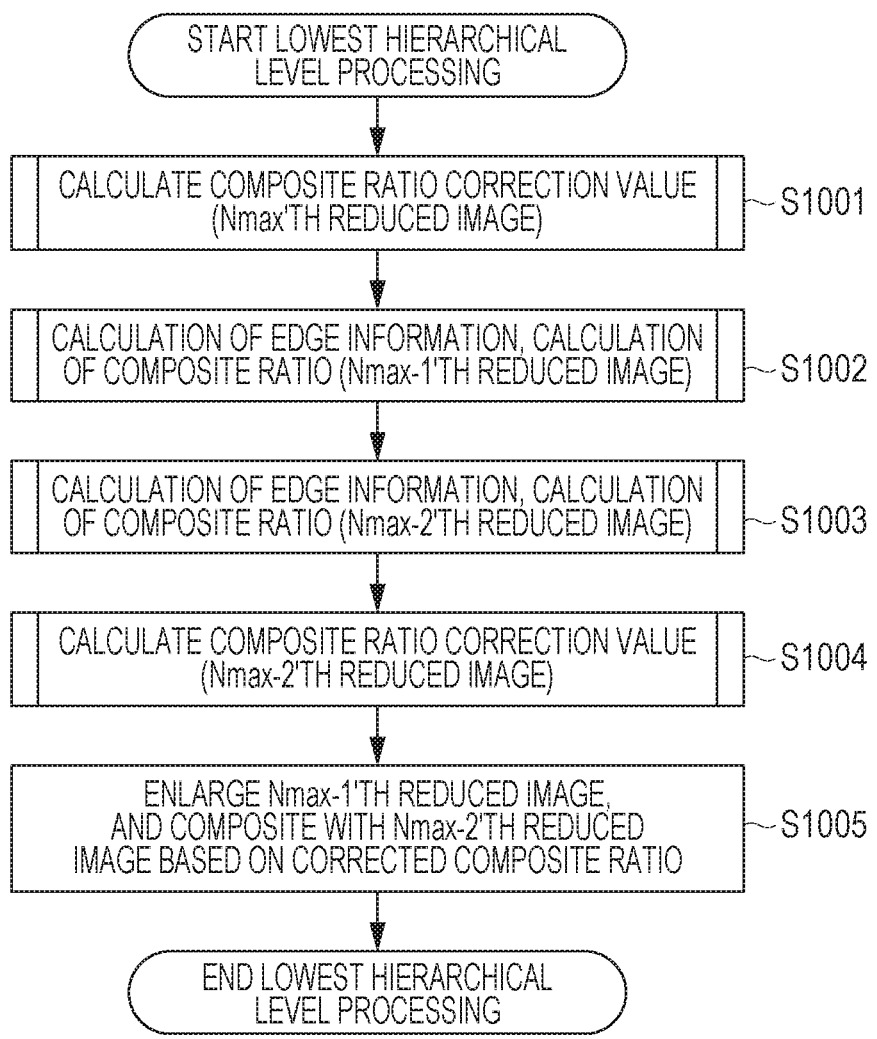
FIG. 7 is a flowchart of lowest hierarchical level processing.
Figure 8A:
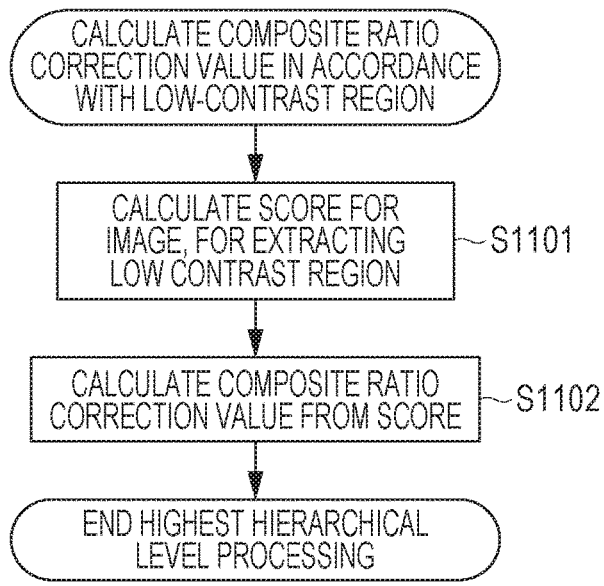
FIGS. 8A through 8C are flowcharts illustrating details of each processing at the lowest hierarchical level.

FIG. 7 illustrates the details of processing of the lowest hierarchical level. In step S1001, the composite ratio correction value deriving unit 110 derives a composite ratio correction value with regard to the Nmax'th reduced image that has been reduced the farthest. FIG. 8A is a flowchart illustrating the details of calculating the composite ratio correction value. In step S1101, the low-contrast region extracting unit 501 calculates a score for extracting a low-contrast region with regard to each pixel in the Nmax'th reduced image. The score is calculated using the above-described Expression (1). In step S1102, the composite ratio correction value calculating unit 502 calculates the composite ratio correction value based on the score for each pixel.

Figure 8B:
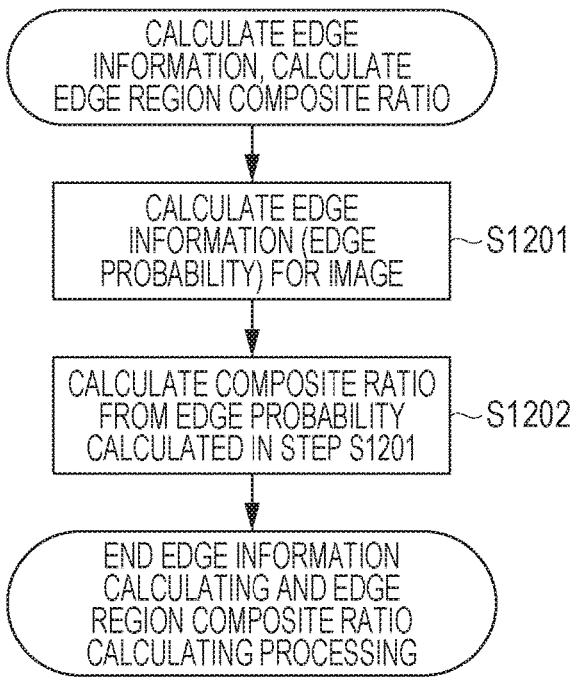

In step S1002, the edge detection unit 108 performs edge detection for the Nmax−1'th reduced image. FIG. 8B illustrates a detailed flowchart of the edge detection processing. In step S1201, the edge probability calculating unit 301 calculates the edge probability for the Nmax−1'th reduced image that is one hierarchical level above. Further, in step S1202, the composite ratio deriving unit 109 calculates a composite ratio based on the edge of each pixel in the Nmax−1'th reduced image. The composite ratio is calculated here with regard to pixels with a high edge probability so that the composite ratio of the Nmax−2'th reduced image is high. The edge probability is compared with a predetermined threshold value, and in a case where the edge probability is equal to or above the predetermined threshold value, the composite ratio of the Nmax−2'th reduced image may be derived as a predetermined value (e.g., 1.0), or an arrangement may be made where the composite ratio consecutively increases as the edge probability increases. In this case, the composite ratio corresponding to the edge probability may be found using a look-up table (LUT) or expression correlating the edge probability and composite ratio correlating thereto.

In step S1003, the edge detection unit 108 calculates the edge probability for the Nmax−2'th reduced image that is one hierarchical level above the Nmax−1'th reduced image, and the composite ratio deriving unit 109 calculates the composite ratio for each pixel in the Nmax−2'th reduced image. The composite ratio is calculated by the same method as in step S1202.

In step S1004, the composite ratio deciding unit 601 calculates the composite ratio based on the composite ratio calculated in steps S1002 and S1003, and the composite ratio correction value calculated in step S1001. Note that the number of corresponding pixels differs for the composite ratio and composite ratio correction value calculated in steps S1002 and S1003, since the reduction ratio is different among the images to be processed. Accordingly, the final composite ratio is calculated after having performed expanded interpolation (e.g., bilinear interpolation) of the lower hierarchical level calculated with regard to the lower hierarchical level reduced image.

Figure 8C:
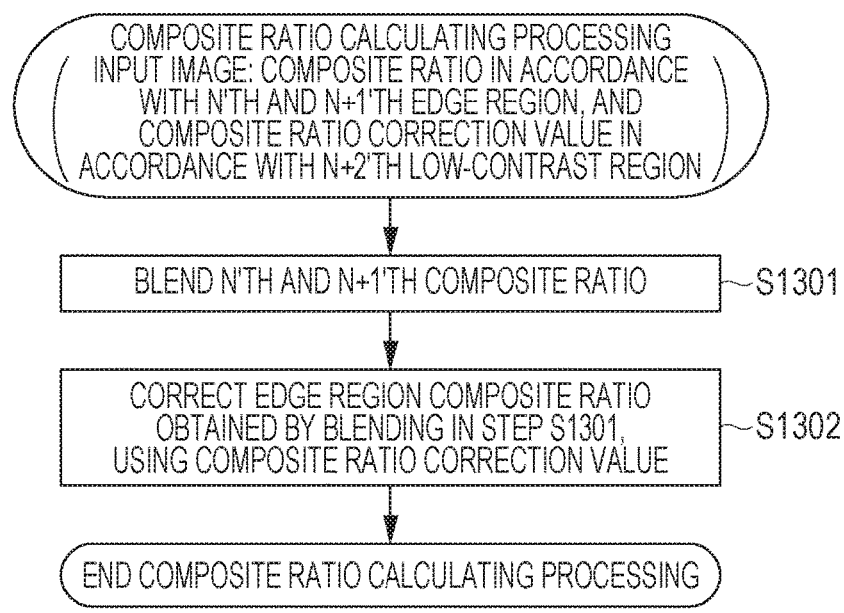

FIG. 8C illustrates the details of the composite ratio calculation processing in step S1004. The blending unit 602 blends the composite ratios calculated in steps S1002 and S1003 in step S1301. Specifically, the composite ratios are blended according to Expression (2)

$$R_{N,N+1}(x,y)=aR_N(x,y)+(1-a)R_{N+1}(x,y) \quad (2)$$

where a=0.5.

Now, $R_{N,N+1}(x,y)$ is the post-blending composite ratio, $R_N(x,y)$ and $R_{N+1}(x,y)$ being a composite ratio calculated from the N'th edge probability and a composite ratio calculated from the N'+1th edge probability, respectively. These composite ratios are defined so that the higher the edge probability is, the larger the value is. In the processing of the lowest hierarchical level, the Nmax−2'th is applied for the N'th, and the Nmax−1'th is applied for the N+1'th.

Although an example where the average of the N'th and N+1'th composite ratio is calculated has been illustrated in the present embodiment, this is not necessarily restricted to an average. The weighting a as to the composite ratio of the highest hierarchical level (N'th here) preferably is between 0.2 and 0.5.

In step S1302, the correcting unit 603 corrects the composite ratio blended in step S1301, using the composite ratio correction value calculated in step S1102. Specifically, the correction value is added, as shown in Expression (3)

$$Rc,N(x,y)=R_{N,N+1}(x,y)+R_{Lc,N+2}(x,y) \quad (3)$$

where $R_{c,N}(x,y)$ is the composite ratio of the N'th image when compositing the N'th and N+1'th images, i.e., the weighting that the N'th image is multiplied by. The weighting by which the N+1'th image is multiplied is $1-R_{c,N}(x,y)$. $R_{Lc,N+2}(x,y)$ is the composite ratio correction value calculated from the score for extracting the low-contrast region for the N+2'th hierarchical level. The larger the edge probability is, the larger the post-blending composite ratio $R_{N,N+1}(x,y)$ is, and also the composite ratio correction value $R_{Lc,N+2}(x,y)$ exhibits a large value in a low-contrast region. Accordingly, the composite ratio $R_{c,N}(x,y)$ is large in edge regions and low-contrast regions.

$$R_{C,N}(x,y)=R_{N,N+1}(x,y)+R_{LC,N+2}(x,y) \quad (3)$$

where $R_{C,N}(x,y)$ is the composite ratio of the N'th image when compositing the N'th and N+1'th images, i.e., the weighting that the N'th image is multiplied by. The weighting by which the N+1'th image is multiplied is $1-_{RC,N}(x,y)$. $R_{LC,N+2}(x,y)$ is the composite ratio correction value calculated from the score for extracting the low-contrast region for the N+2'th hierarchical level. The larger the edge probability is, the larger the post-blending composite ratio $R_{N,N+1}(x,y)$ is, and also the composite ratio correction value $R_{LC,N+2}(x,y)$ exhibits a large value in a low-contrast region.

Accordingly, the composite ratio $R_{C,N}(x,y)$ is large in edge regions and low-contrast regions.

In step S1005, the compositing unit 604 composites the Nmax−1'th reduced image and Nmax−2'th reduced image in increments of pixels, based on the composite ratio calculated in step S1004. The compositing unit 604 enlarges the Nmax−1'th reduced image in accordance with the size of the Nmax−2'th reduced image, and thereafter composites the pixel values of the corresponding pixel positions. Compositing is performed based on Expression (4) in the present embodiment $$I_{O,N}(x,y)=R_{C,N}(x,y)I_{O,N}(x,y)+(1-R_{C,N}(x,y))I_{O,N+1}(x,y) \quad (4)$$

where $I_{O,N}(x,y)$ is the image of the N'th hierarchical level, and $I_{O,N+1}(x,y)$ is the image of the N+1'th hierarchical level. Compositing in this way enables the percentage of higher hierarchical levels where sharpness is high to be increased in edges and low-contrast regions, and the percentage of lower hierarchical levels where there is little noise to be increased in smooth regions. Thus, processing of the lowest hierarchical level ends.

Figure 9:
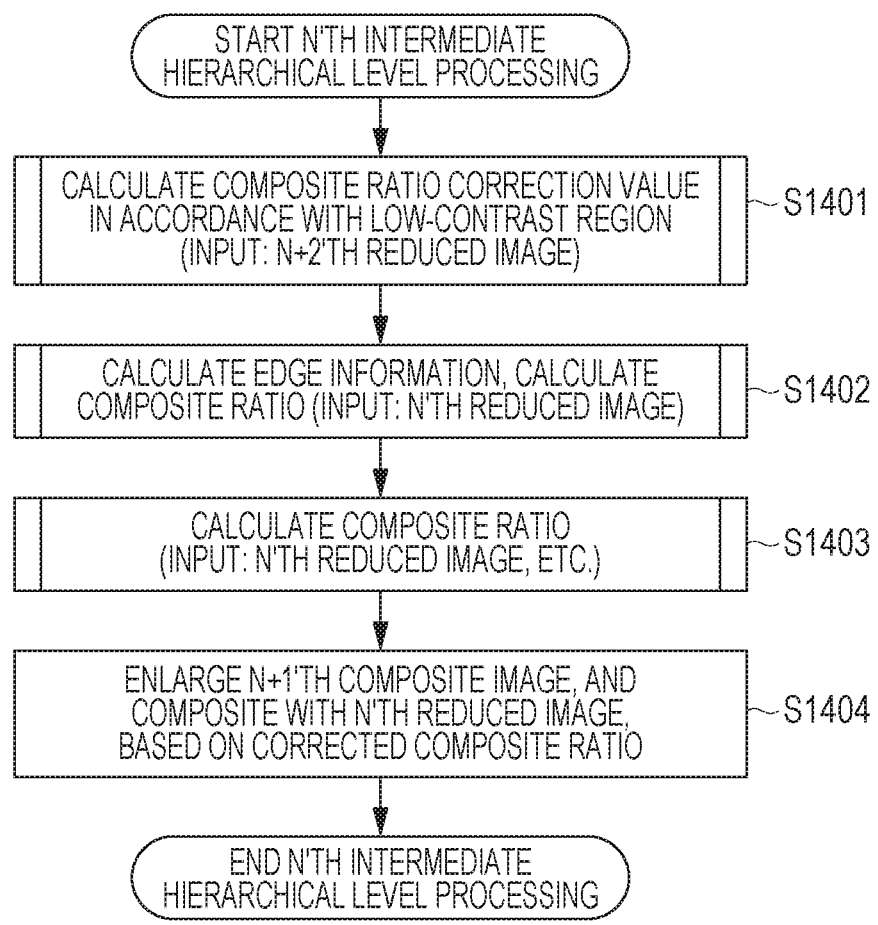
FIG. 9 is a flowchart illustrating details of intermediate hierarchical level processing.
Figure 10:
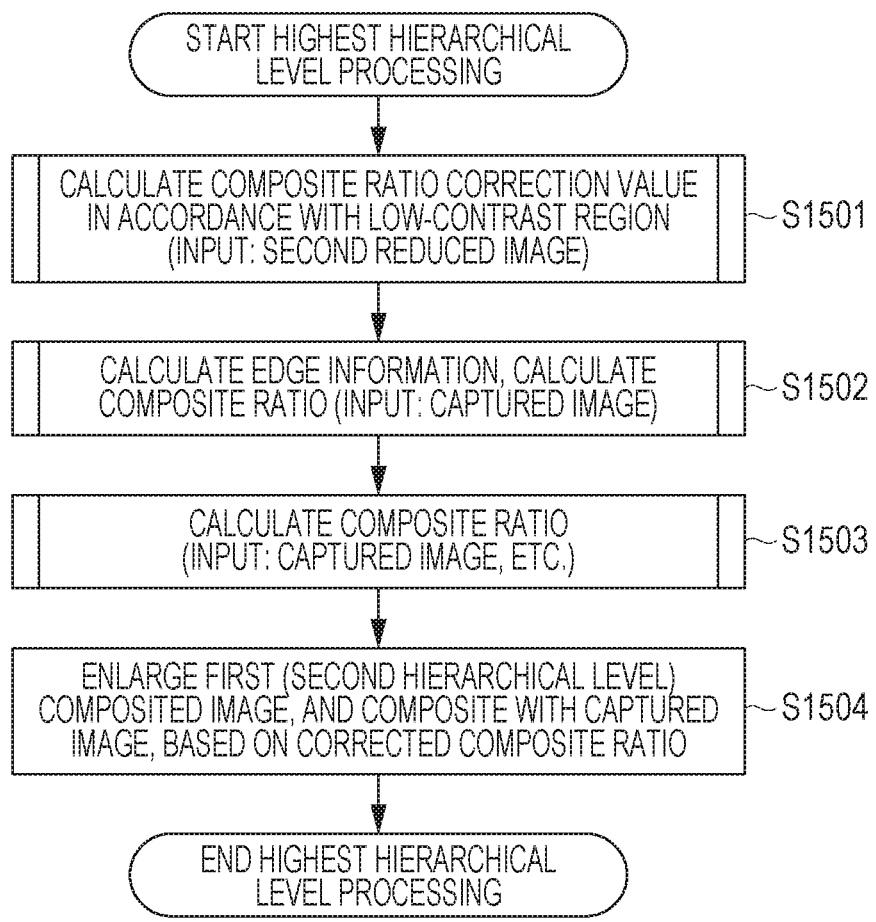
FIG. 10 is a flowchart illustrating highest hierarchical level processing.

FIG. 9 is a flowchart illustrating the details of processing of intermediate hierarchical levels, of which the N'th hierarchical level is the object. In step S1401, the composite ratio correction value deriving unit 110 derives the N+2'th composite ratio correction value. In step S1402, the edge detection unit 108 calculates edge information with regard to the N'th reduced image, and calculates the composite ratio based on the edge information. In step S1403, the composite ratio deciding unit 601 calculates the composite ratio. The processing in Step S1401, step S1402, and step S1403 respectively correspond to processing in FIGS. 8A, 8B, and 8C, and are the same except for the input reduced images being different, so detailed description will be omitted. In step S1404, the compositing unit 604 composites the composited image of the N+1'th hierarchical level and the reduced image of the N'th hierarchical level, based on the composite ratio calculated in step S1403. FIG. 10 is a processing flowchart of the highest hierarchical level. The structure of processing is the same as the processing of intermediate hierarchical levels except that the input for the upper-side hierarchical level is the input image instead of a reduced image, so detailed description will be omitted.

According to the embodiment as described above, compositing multiple reduced images of different reduction ratios enables an image to be obtained where edges to be preserved in edge regions, and noise is reduced in smooth portions. When compositing an image of an upper hierarchical level where sharpness is high (reduction ratio is small) and a lower hierarchical level where noise reduction effects are strong (reduction ratio is great), the composite ratio is set to be high for the upper hierarchical levels in edge regions, and the composite ratio of lower hierarchical levels is set to be higher in smooth portions. The two composite ratios derived based on the results of edge detection at each of the two different reduced images are blended, as shown in Expression (2). Although a reduced image at an upper hierarchical level where sharpness is strong is originally preferable for edge detection, but there are cases where excessive noise prevents correct edge detection. For example, edge detection is performed on an image that has been reduced to ¼ in the vertical and horizontal directions. Enlarging the reduced image for compositing with the image at the upper hierarchical level results in the detected edges being thicker than the edges before reduction. In particular, this tends to be more pronounced near edges where contrast is high. Accordingly, deciding the composite ratio based on the edges that have become thick by this enlarging may result in the composite ratio of the upper hierarchical level image with strong sharpness to be great in regions near the edge that originally were smooth. Accordingly, the composite ratio derived based on edges in the upper hierarchical level image where sharpness is strong, and the composite ratio derived based on edges in the lower hierarchical level image where sharpness is weaker but there is little noise, are blended in the present embodiment. This enables edge detection accuracy to be improved.

Further, in the present embodiment, regions including low-contrast edges are extracted in reduced images at lower hierarchical levels (reduction ratio is high), and a composite ratio correction value where the value is great only at low-contrast edges is added to the composite ratio. Low-contrast edges and textures are readily affected by noise. The higher the reduction ratio is, the more noise is reduced in the reduced image, so performing edge detection in reduced images with a great reduction ratio is conceivable, in order to increase the detection rate of low-contrast edges and textures. However, detecting edges in reduced images of which the reduction ratio is great, and enlarging the detection results to an image of the original size, results in the detected edges being thick due to the enlarging processing, which has been described above. Accordingly, even if the edge detection rate is improved by reduction, effects of noise reduction is not obtained at smooth portions near the edges. On the other hand, in the present embodiment, only low-contrast regions are detected in images with high reduction ratios than images where high-contrast edges are detected, and the composite ratio correction value is added only to the composite ratio of the low-contrast regions. A value close to zero is calculated for the composite ratio correction value for smooth regions and high-contrast regions. Accordingly, noise can be reduced in low-contrast region while maintaining sharpness, without losing the effects of noise reduction in smooth regions near edges, and without deterioration of sharpness in high-contrast regions. Both of the two composite ratios are derived to be appropriate for edge regions, so a composite ratio appropriate for edge regions can be maintained even after blending. On the other hand, a value close to zero is calculated in the high-contrast regions regarding the composite ratio correction value specialized for low-contrast regions, so blending this with the composite ratio would lower the composite ratio for edges. Accordingly, addition processing is performed in the present embodiment instead of blending, to improve the composite ratio at low-contrast regions without reduction in the composite ratio for edges.

Note that description has been made that the edge detection unit 108 according to the first embodiment calculates the sum of absolute values of horizontal-direction and vertical-direction differentials as the edge probability, but this is not restrictive. The edge probability may be an absolute value such as output applying an edge detection filter such as a Sobel filter or the like, for example, which is an index that assume a larger value the larger the difference in luminance is at the edge. A form having an optical system, image sensor, and an image processor that performs image processing, such as a camera, has been exemplified as a form of an image processing apparatus according to the present embodiment. Other forms may be a smartphone or tablet having a camera, or the like. Another form is reading in images captured by a camera and performing image processing, such as a personal computer or the like.

The score shown in Expression (1) also is not restrictive, and any arrangement may be used as long as a small value is assumed in smooth regions, high-contrast edges, high-contrast texture regions, and so forth, and a large value is assumed in low-contrast regions. A value obtained by taking an index using the edge probability instead of the above-described local variance as the index z, and substituting this into the function $T(z)$ so as to be smaller at smooth portions and high-contrast edges, may also be used as a score. These can be designed in the trade-off between processing speed or processing costs and capabilities.

Second Embodiment

The captured image and reduced images have been described as being composited as they are in the first embodiment. In order to further improve noise reduction effects, an example of introducing weighted average processing to each of the captured image and reduced images will be described in the second embodiment. Configurations that are the same as in the first embodiment are denoted by the same reference numerals, and detailed description will be omitted.

Figure 11:
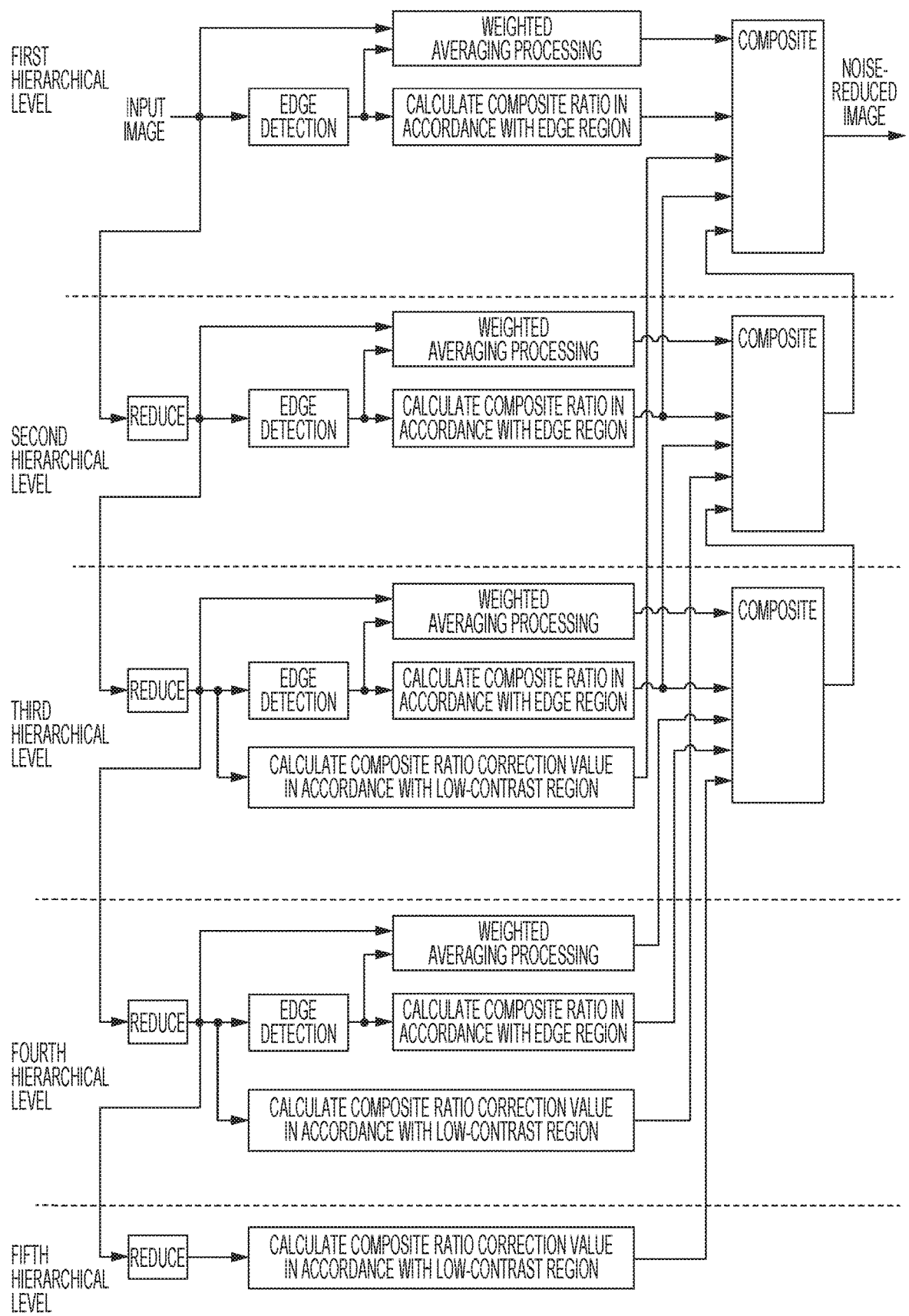
FIG. 11 is a diagram for describing an overall image of noise reduction processing according to a second embodiment.
Figure 12A:
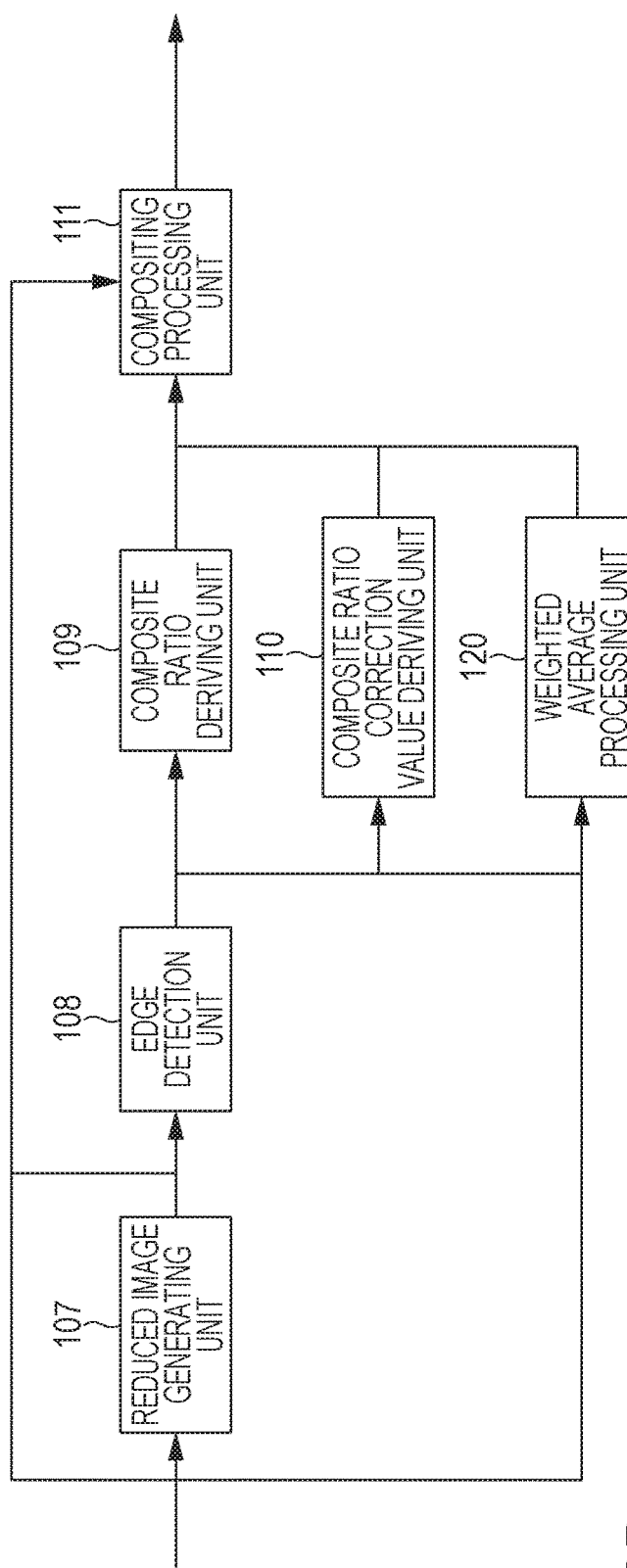
FIGS. 12A and 12B are block diagrams illustrating configurations of an image processing apparatus.
Figure 12B:
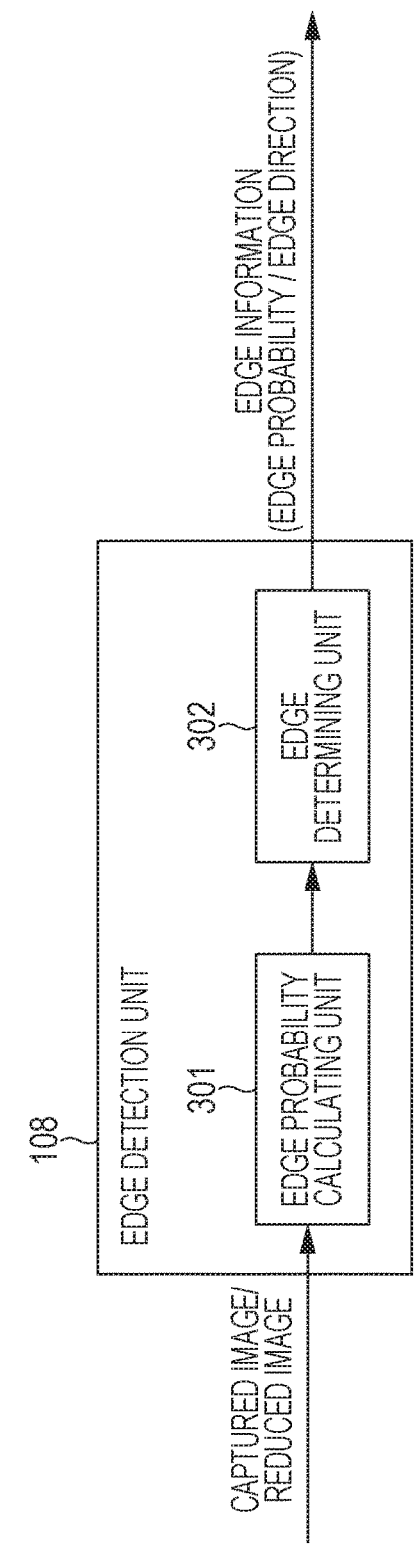

Image processing according to the second embodiment will be described with reference to FIG. 11. FIG. 11 is a schematic diagram for describing the relation between the images and processing in the second embodiment. In the present embodiment, compositing is performed after having executed weighting averaging processing corresponding to the edge detection results of the input image and multiple reduced images. FIG. 12A is a block diagram illustrating the logical configuration of the image processing apparatus according to the second embodiment. The present embodiment includes, in addition to the configuration of the first embodiment, a weighted average processing unit 120. The weighted average processing unit 120 performs weighted average processing regarding an input image or reduced image. The edge detection unit 108 also has an edge determining unit 302, as illustrated in FIG. 12B. The edge determining unit 302 determines the direction of edges. The edge detection unit 108 according to the present embodiment outputs edge probability and edge direction as edge information. The weighted average processing unit 120 performs weighting averaging following the edge direction, and generates and outputs a weighted averaged image where noise has been reduced while maximally maintaining sharpness. The processing of the compositing processing unit 111 is the same as in the first embodiment, but the input image is a weighted averaged image instead of a captured image or reduced image.

Figure 13:
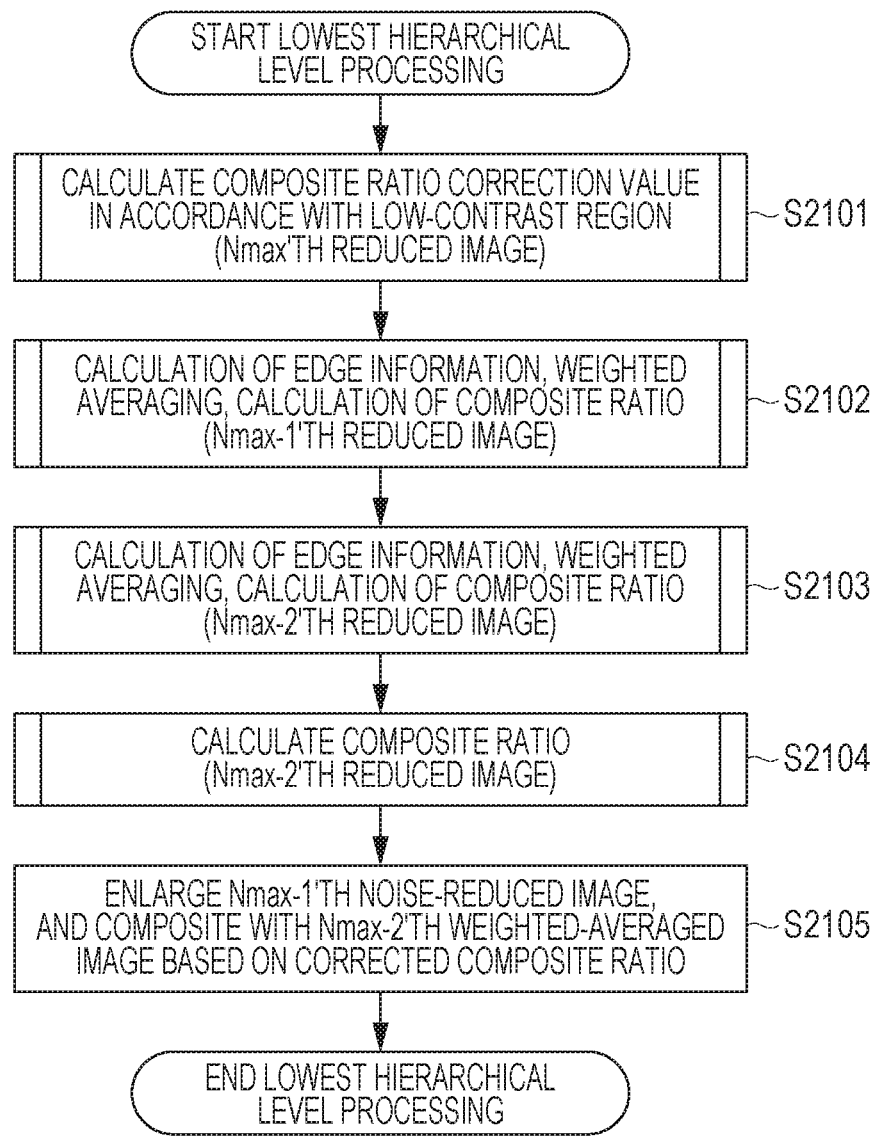
FIG. 13 is a flowchart of lowest hierarchical level processing.

The flow of noise reduction processing according to the second embodiment will be described with reference to the flowcharts illustrated in FIGS. 13 through 16. The overall image of the processing is the same as in FIG. 6 in the first embodiment. FIG. 13 illustrates the processing flow at the lowest hierarchical level.

Step S2101 is the same as step S1001 in the first embodiment. In step S2102, edge information is calculated regarding the Nmax−1'th reduced image, weighted average processing is performed, and further, the composite ratio is calculated. This differs from step S1002 with regard to the point that the weighted average processing is included. In step S2103, processing the same as in step S2102 is performed on the Nmax−2'th reduced image. In step S2104, a composite ratio is calculated based on the composite ratios calculated in steps S2102 and S2103, and the composite ratio correction value calculated in step S2101. In step S2105, the Nmax−1'th weighted averaged image is enlarged in accordance with the size of the Nmax−2'th weighted averaged image, and composited with the Nmax−2'th weighted averaged image based on the composite ratio calculated in step S2104.

Figure 14:
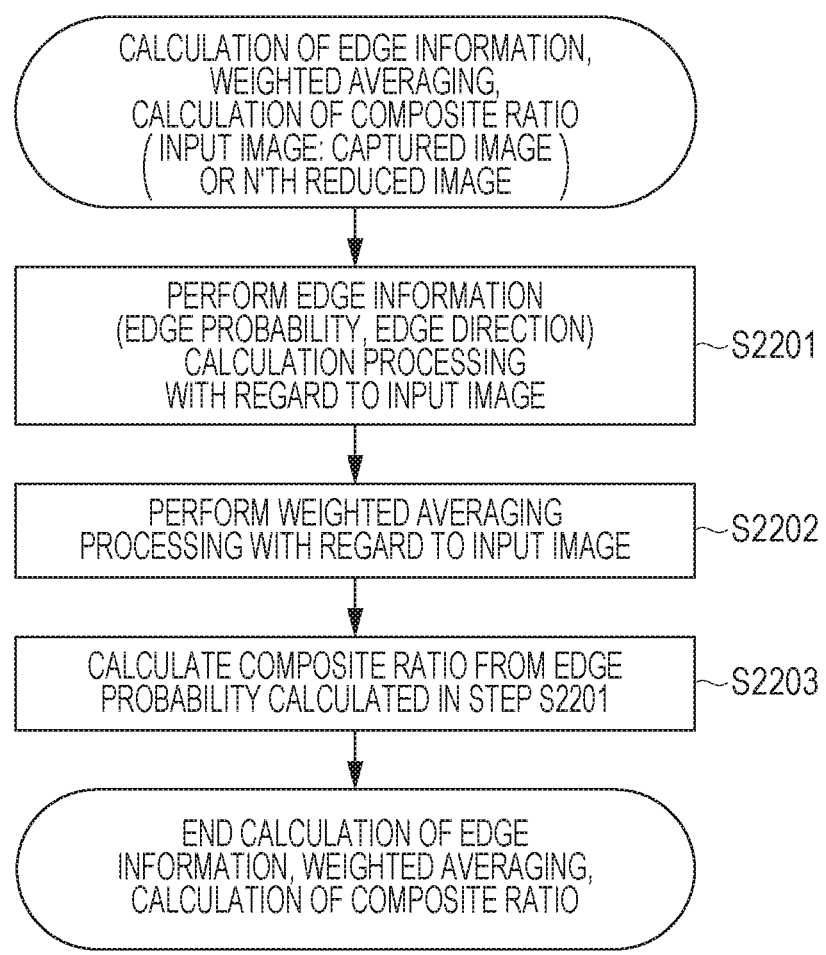
FIG. 14 is a flowchart illustrating details of edge information calculation, weighted averaging, and edge region composite ratio calculation processing.

FIG. 14 illustrates details of processing executed in steps S2102 and S2103. In step S2201, edge detection processing is performed on an input reduced image, and the edge probability and edge direction are calculated. In step S2202, weighted average processing is performed based on the edge probability and edge direction calculated in step S2201. In step S2203, the composite ratio is calculated based on the edge probability calculated in step S2201.

Figure 15:
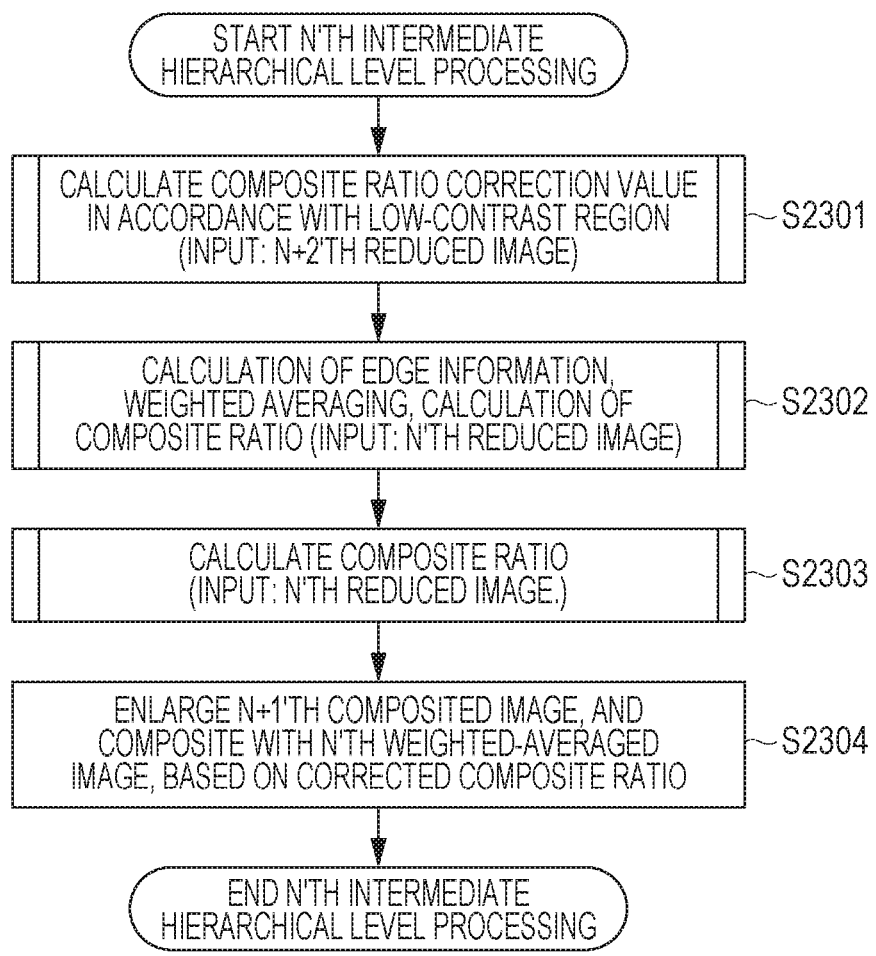
FIG. 15 is a flowchart illustrating details of intermediate hierarchical level processing.

FIG. 15 illustrates details of intermediate hierarchical level processing, of which the N'th hierarchical level is the object. In step S2301, the composite ratio correction value of the N+2'th hierarchical level is calculated. In step S2302, edge information is calculated with regard to the N'th reduced image, weighted average processing is performed based thereupon, and further, the composite ratio is calculated. The composite ratio is calculated in step S2303. In step S2304, the composited image of the N+1'th hierarchical level and the weighted averaged image of the N'th hierarchical level are composited, based on the composite ratio obtained in step S2303.

Figure 16:
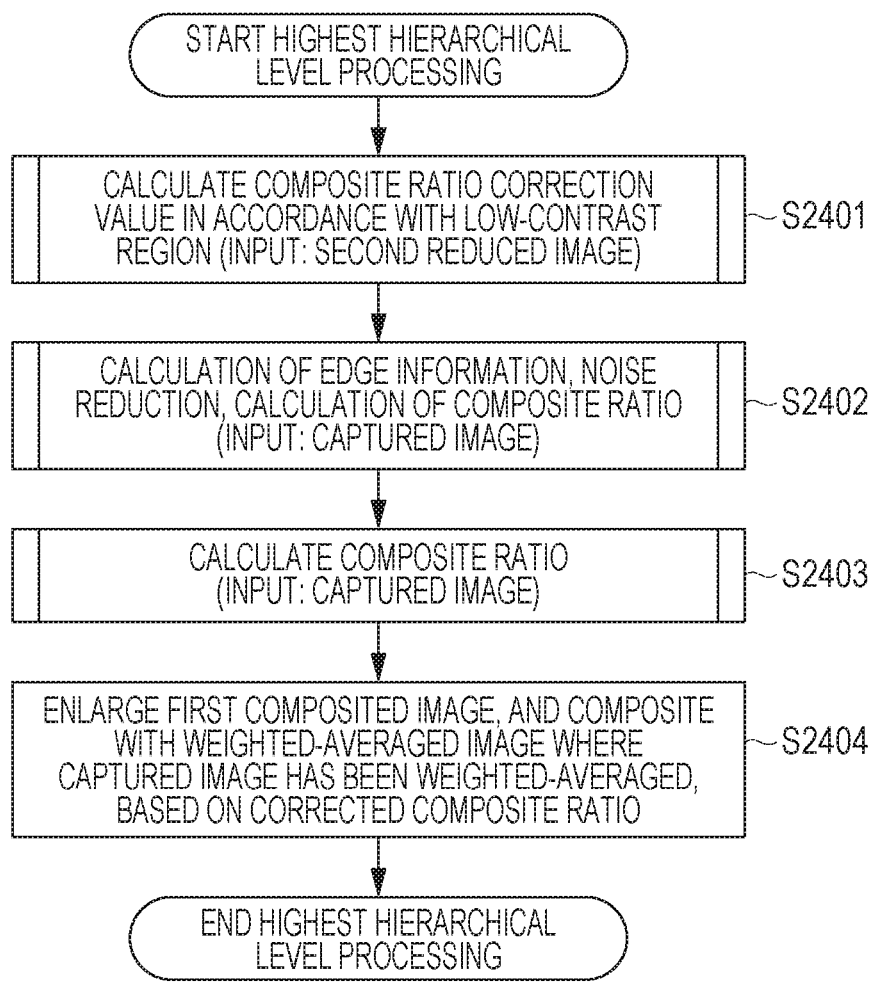
FIG. 16 is a flowchart illustrating highest hierarchical level processing.

FIG. 16 illustrates details of processing of the highest hierarchical level. This is the same as processing of intermediate hierarchical levels in FIG. 9, except for the input of the upper-side hierarchical level being a captured image instead of a reduced image, so detailed description will be omitted.

As described above, in addition to the configuration of the first embodiment, weighted average processing is performed on each hierarchical level in the second embodiment. The point of extracting only low-contrast regions where the S/N ratio is low, and correcting the composite ratio is the same as in the first embodiment. Accordingly, both the effect for reduced noise near edges and sharpness in low-contrast regions can be realized.

Third Embodiment

Description has been made in the first and second embodiments where the final composite ratio is calculated based on the composite ratios calculated at the N'th hierarchical level and the N+1'th hierarchical level, and the composite ratio correction value calculated at the N+2'th hierarchical level. In a third embodiment, description will be made regarding a method of calculating the final composite ratio based on the composite ratio calculated at the N'th hierarchical level and composite ratio correction values calculated at the N+1'th and N+2'th hierarchical levels.

The configuration of the image processing apparatus according to the third embodiment is almost the same as that of the second embodiment. The composite ratio correction value deriving unit 110 calculates low-contrast region composite ratio correction values for the N+1'th and N+2'th hierarchical levels, using different methods for each. Configurations that are the same as in the second embodiment are denoted by the same reference numerals, and detailed description will be omitted.

Figure 18:
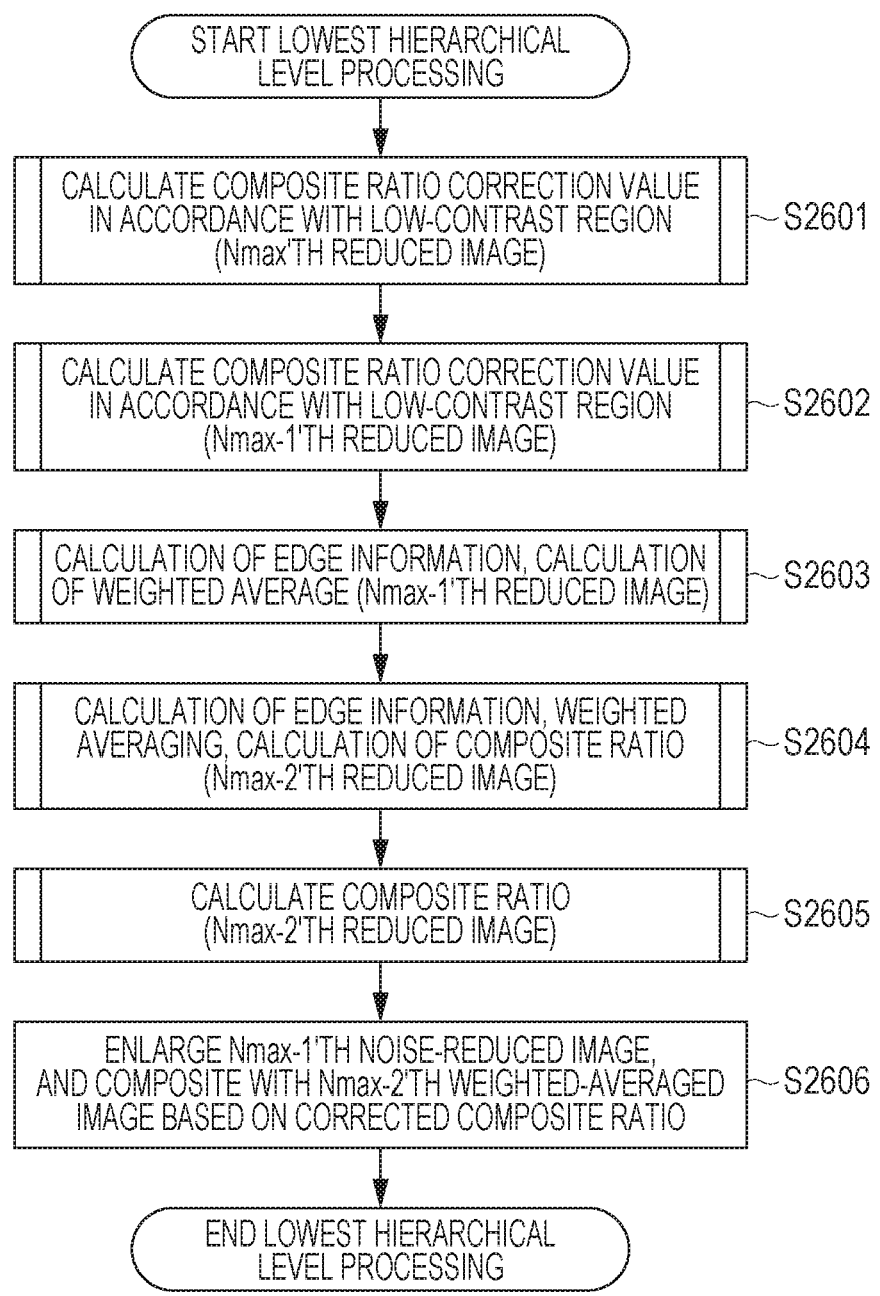
FIG. 18 is a flowchart of lowest hierarchical level processing.

The flow of noise reduction processing in the third embodiment will be described with reference to the flowcharts in FIGS. 18 through 22. The overall image of processing is the same as in FIG. 6. FIG. 18 illustrates the processing flow at the lowest hierarchical level.

Step S2601 is the same as step S1001 in the first embodiment. In step S2602, processing the same as in step S1001 is performed on the Nmax−1'th reduced image. In step S2603, edge information is calculated and weighted average calculation processing is performed regarding the Nmax−1'th reduced image. Step S2604 is the same as step S2103 in the second embodiment.

In step S2605, the composite ratio calculated in step S2604 and the composite ratio correction values calculated in steps S2601 and 2602 are used to calculate the composite ratio. In step S2606, the Nmax−1'th weighted averaged image is enlarged in accordance with the size of the Nmax−2'th weighted averaged image, and composited with the Nmax−2'th weighted averaged image based on the composite ratio calculated in step S2605.

Figure 19:
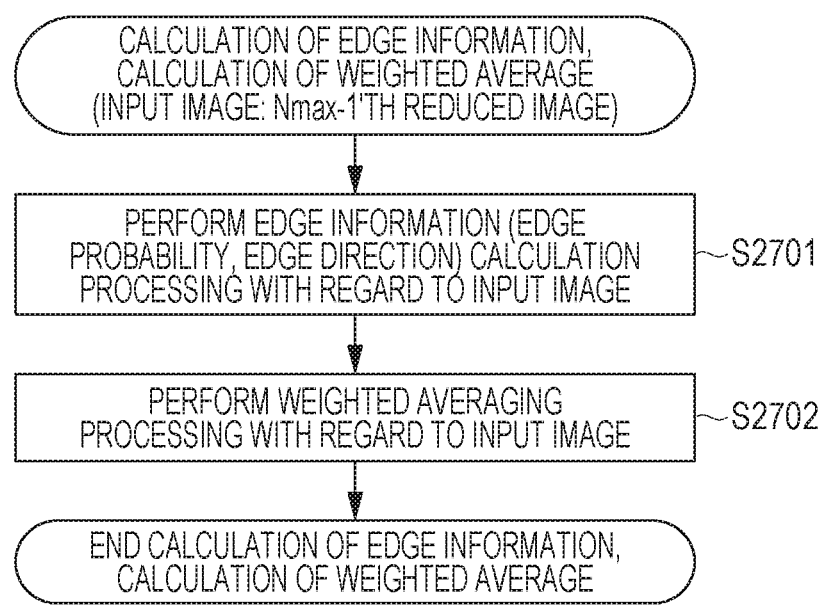
FIG. 19 is a flowchart illustrating details of edge information calculation and weighted averaging calculation processing.

FIG. 19 illustrates detailed processing performed in step S2603. This differs from step S2103 in the second embodiment with regard to the point that there is no step for calculating the composite ratio.

Figure 20:
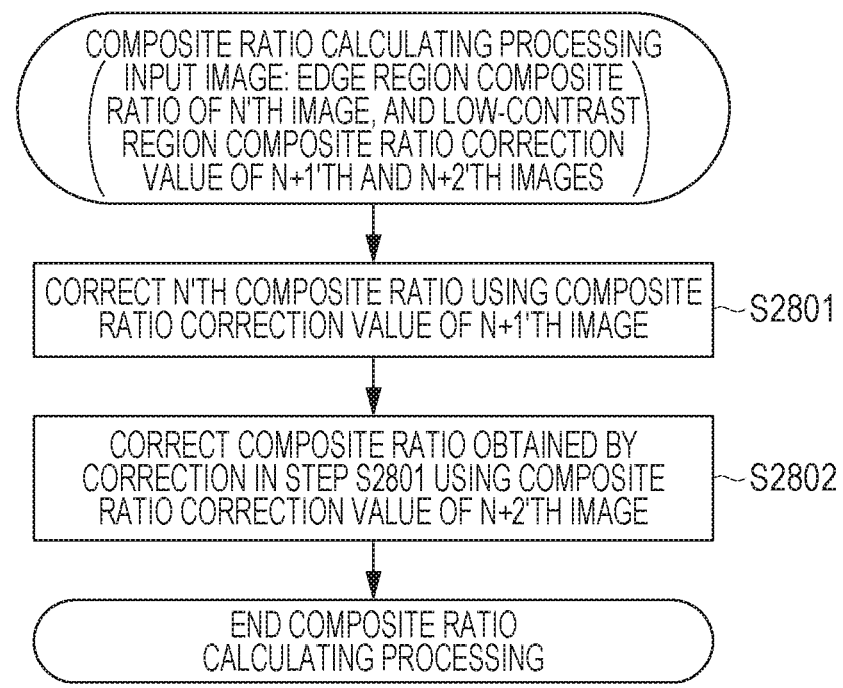
FIG. 20 is a flowchart illustrating details of composite ratio calculation processing.

FIG. 20 illustrates the details of the composite ratio calculation processing in step S2605. The composite ratio calculated based on the N'th edge is corrected by a composite ratio correction value calculated based on the N+1'th and N+2'th low-contrast regions in the present embodiment. Specifically, this can be calculated by adding the N+1'th and N+2'th composite ratio correction values to the N'th composite ratio, as shown in the following Expression (5).

$$R_{C,N}(x,y) = R_N(x,y) + R_{LC,N+1}(x,y) + R_{LC,N+2}(x,y) \quad (5)$$

Figure 17:
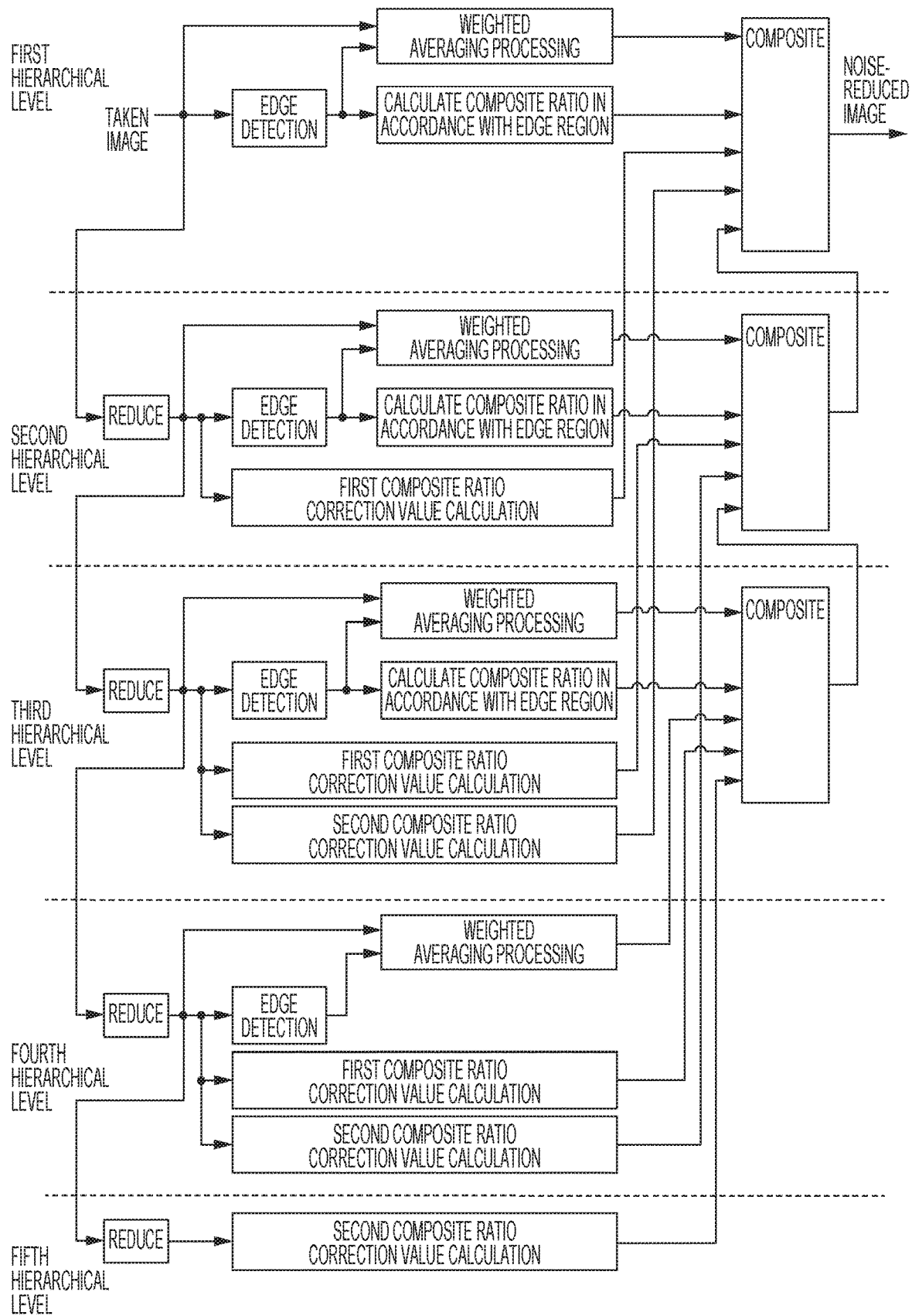
FIG. 17 is a diagram for describing an overall image of noise reduction processing according to a third embodiment.
Figure 21:
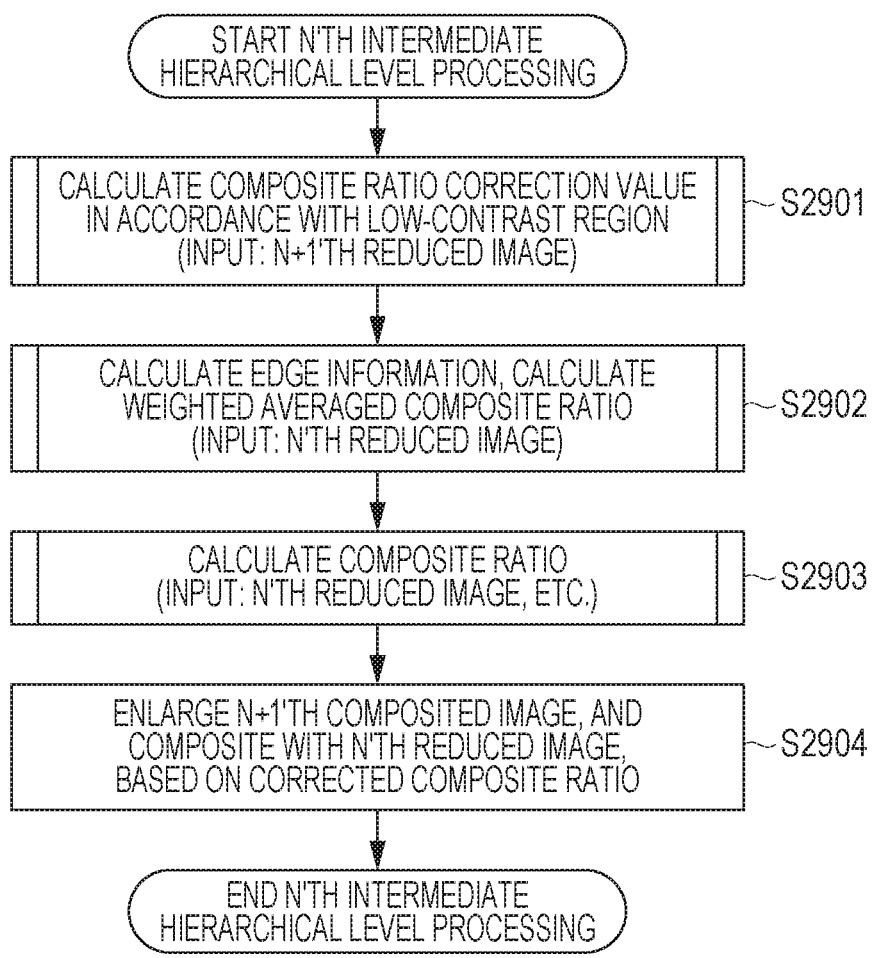
FIG. 21 is a flowchart illustrating intermediate hierarchical level processing.

Accordingly, description will be made in the present embodiment that there are two types of low-contrast region composite ratios, as illustrated in FIG. 17. FIG. 21 illustrates detailed processing of intermediate hierarchical levels. The composite ratio based on the edge information of the N'th reduced image and composite ratio correction values based on low-contrast regions in the N+1'th and N+2'th reduced images are necessary of calculation of the composite ratio used at the end in the N'th hierarchical level. Of these, the composite ratio correction value for the N+2'th reduced image has already been calculated in processing in a previous hierarchical level. Accordingly, the composite ratio correction value for the N+1'th reduced image is calculated in step S2901, and in step S2902, the composite ratio is calculated based on the edge regions of the N'th reduced image. Step S2902 is the same as step S2103, with edge information and weighted average also being calculated. Step S2903 is the same as the processing of step S2605 except for the point that the input image is different. Step S2904 also is the same compositing processing as step S2606.

Figure 22:
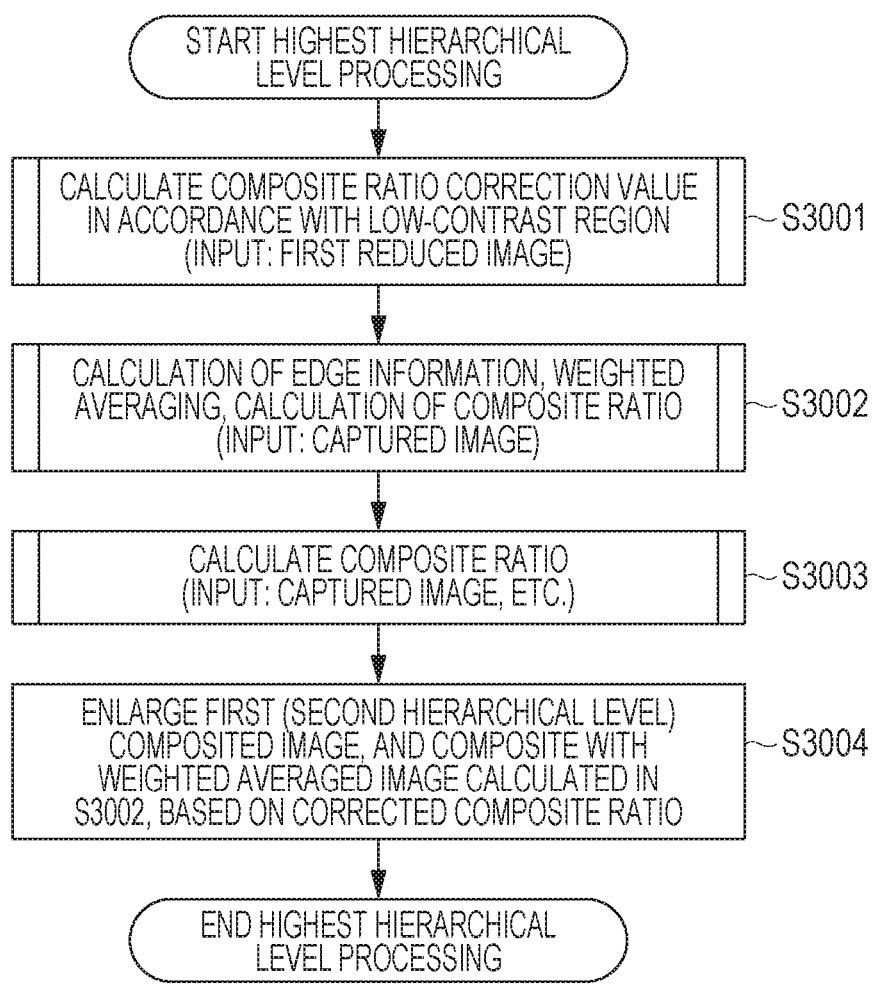
FIG. 22 is a flowchart illustrating highest hierarchical level processing.

FIG. 22 illustrates details of processing of the highest hierarchical level. In step S3001, a composite ratio correction value based on low-contrast regions is calculated with regard to the first reduced image, in the same way as with processing of the intermediate hierarchical levels. In step S3002, the captured image is subjected to processing the same as in step S2402. The composite ratio calculation processing, of which the details are illustrated in FIG. 20, is performed in step S2503. In step S3004, the first composited image is enlarged based on the composite ratio calculated in step S3003, and composited with the weighted averaged image calculated in step S3002.

According to the present embodiment as described above, the phenomenon where the edge detection results become thicker due to enlargement at the image at the N+1'th hierarchical level, and noise reduction effects near edges decreasing, can be avoided. As a matter of course, the low-contrast region results at the N+2'th hierarchical level are also used, so noise can be reduced without blurring in the low-contrast texture regions as compared to the related art.

Both the effect for reduced noise near edges and sharpness in low-contrast regions can be realized in the third embodiment as well, and the width of regions near the edges where noise reduction effects are reduced can be made narrower.

Other Embodiments

In the above-described embodiments, an example has been described where an input image is successively reduced. However, in a case where the input image and reduced images where the input image has been reduced to the predetermined reduction ratios can be obtained, reduction processing may be unnecessary.

Description has also been made above that the composite ratio based on edges and the composite ratio correction value based on low-contrast regions are each calculated, and thereafter the composite ratio to be used for the compositing processing in the end is calculated. For example, in the case of the first embodiment, a look-up table, where the three values of the edge probabilities of the N'th reduced image and the N+1'th reduced image, and the score at the N+2'th reduced image, are correlated with composite ratios, may be used. In this case, the composite ratio can be derived from the edge probabilities of the N'th reduced image and the N+1'th reduced image and the score at the N+2'th reduced image. The composite ratios correlated to the two edge probabilities and the score for extracting low-contrast regions in the look-up table preferably have been calculated in the same way as with the method described in the above embodiments.

An example has been described in the above examples regarding a case of using reduction processing as a method for dividing an image into frequency bands. The number of pixels is reduced in reduction processing by thinning out pixels. Accordingly, processing for edge detection and low-contrast edge detection with regard to reduced images can be reduced. However, an arrangement may be made where thinning out is not performed, and filtering processing using low-pass filters is applied. Images are generated by filtering processing on the input image using low-pass filters having different cutoff frequencies. Images subjected to filtering processing by low-pass filters having high cutoff frequencies can be used as lower hierarchical level images.

Description has been made in the above embodiments regarding an example of a case where the processes are realized by software where the CPU 115 executes predetermined programs. However, all or part of the configurations illustrated in FIGS. 1B through 3 may be realized by a dedicated image processing circuit (e.g., an application-specific integrated circuit (ASIC)), for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-150550 filed Aug. 3, 2017, which is hereby incorporated by reference herein in its entirety.

What is claimed is:

1. An image processing apparatus configured to divide an image into frequency bands and reduces noise, in which a first image includes a high-band frequency component, and a second image includes a low-band frequency component, the image processing apparatus comprising:
  a processor; and
  a memory containing instructions that, when executed by the processor, cause the processor to function as:
    a first detecting unit configured to detect a first edge having a first contrast in at least one of the first image and the second image,
    a second detecting unit configured to detect a second edge having a second contrast lower than the first contrast in an other of the at least one of the first image and the second image,
    a compositing unit configured to composite the first image and the second image using a weighting corresponding to the first edge and the second edge, and
    a deciding unit configured to decide a composite ratio for each pixel, based on edge detection results by the first detecting unit and the second detecting unit,
  wherein the first contrast and the second contrast are based on a local variance of the first edge and the second edge, respectively,
  wherein the compositing unit is configured to composite pixel values in the first image and pixel values in the second image using the composite ratio,
  wherein the first detecting unit is configured to calculate an edge probability for each pixel,
  wherein the second detecting unit is configured to calculate a low-contrast score that has a value that increases to reach a greatest value and then decreases in a low-contrast region, and
  wherein the deciding unit is configured to correct the composite ratio corresponding to the edge probability, based on the low-contrast score.

2. The image processing apparatus according to claim 1, wherein a third image includes a low-band frequency component, wherein the low-band frequency component of the third image is lower than the low-band frequency component of the second image, and wherein the compositing unit uses the weighting to composite the first image, the second image, and the third image.

3. The image processing apparatus according to claim 2, wherein the first image is an input image, and the second image and the third image are images generated by performing reduction processing on the first image.

4. The image processing apparatus according to claim 3, wherein the first detecting unit is configured to detect the first edge from the first image or the second image, and wherein the second detecting unit is configured to detect the second edge from the third image.

5. The image processing apparatus according to claim 2, wherein the second detecting unit detects a region that is neither a smooth region nor a third edge as the second edge in the third image.

6. The image processing apparatus according to claim 1, wherein the processor further functions as:
a weighted average processing unit configured to perform weighted average processing on each of the first image and the second image,
wherein the compositing unit is configured to composite the first image and the second image output from the weighted average processing unit.

7. The image processing apparatus according to claim 1, wherein the deciding unit is configured to increase the composite ratio for the first image with regard to pixels detected as being the first edge by the first detecting unit and pixels detected as the second edge by the second detecting unit.

8. The image processing apparatus according to claim 1, wherein the second detecting unit is configured to calculate variance in pixel values of pixels included in a local region near a pixel of interest in an image that is an object of processing, and detects the second edge based on the variance.

9. The image processing apparatus according to claim 8, wherein the second detecting unit is configured to calculate a low-contrast score that has a characteristic where a value thereof is near 0 in a case where the variance is a value that noise variance can assume, the value increases as variance increases, reaches a maximum value at a predetermined value, and further reduces as variance increases and approximates 0.

10. The image processing apparatus according to claim 1, wherein the first detecting unit is configured to calculate an edge probability of the first image,
wherein the second detecting unit is configured to extract the second edge from the second image and a third image corresponding to a low-frequency component lower than the second image, and
wherein the compositing unit is configured to composite the first image and the second image based on an edge probability of the first image, a low-contrast region of the second image, and a low-contrast region of the third image.

11. A non-transitory computer-readable storage medium storing a program for causing a computer to function as components of an image processing apparatus configured to divide an image into frequency bands and reduces noise, in which a first image includes a high-band frequency component, and a second image includes a low-band frequency component,
wherein the image processing apparatus includes, as the components,
a processor; and
a memory containing instructions that, when executed by the processor, cause the processor to function as:
a first detecting unit configured to detect a first edge having a first contrast in at least one of the first image and the second image,
a second detecting unit configured to detect a second edge having a second contrast lower than the first contrast in an other of the at least one of the first image and the second image,
a compositing unit configured to composite the first image and the second image using a weighting corresponding to the first edge and the second edge, and
a deciding unit configured to decide a composite ratio for each pixel, based on edge detection results by the first detecting unit and the second detecting unit,
wherein the first contrast and the second contrast are based on a local variance of the first edge and the second edge, respectively,
wherein the compositing unit is configured to composite pixel values in the first image and pixel values in the second image using the composite ratio,
wherein the first detecting unit is configured to calculate an edge probability for each pixel,
wherein the second detecting unit is configured to calculate a low-contrast score that has a value that increases to reach a greatest value and then decreases in a low-contrast region, and
wherein the deciding unit is configured to correct the composite ratio corresponding to the edge probability, based on the low-contrast score.

12. An image processing method where image signals are divided into frequency bands and noise is reduced, in which a first image includes a high-band frequency component, and a second image includes a low-band frequency component as a second image, the method comprising:
detecting a first edge having a first contrast in at least one of the first image and the second image;
detecting a second edge having a second contrast lower than the first contrast in an other of the at least one of the first image and the second image;
compositing the first image and the second image using a weighting corresponding to the first edge and the second edge; and
deciding a composite ratio for each pixel, based on edge detection results by the first detecting unit and the second detecting unit,
wherein the first contrast and the second contrast are based on a local variance of the first edge and the second edge, respectively,
wherein the compositing unit is configured to composite pixel values in the first image and pixel values in the second image using the composite ratio,
wherein the first detecting unit is configured to calculate an edge probability for each pixel,
wherein the second detecting unit is configured to calculate a low-contrast score that has a value that increases to reach a greatest value and then decreases in a low-contrast region, and
wherein the deciding unit is configured to correct the composite ratio corresponding to the edge probability, based on the low-contrast score.

13. An image processing apparatus configured to divide an image into frequency bands and reduces noise, in which a first image includes a high-band frequency component, and a second image includes a low-band frequency component, the image processing apparatus comprising:

a processor; and a memory containing instructions that, when executed by the processor, cause the processor to function as:

a first detecting unit configured to detect a first edge having a first contrast in at least one of the first image and the second image, a second detecting unit configured to detect a second edge having a second contrast lower than the first contrast in an other of the at least one of the first image and the second image, a compositing unit configured to composite the first image and the second image using a weighting corresponding to the first edge and the second edge, and a deciding unit configured to decide a composite ratio for each pixel, based on edge detection results by the first detecting unit and the second detecting unit, wherein the first contrast and the second contrast are based on a local variance of the first edge and the second edge, respectively, wherein the compositing unit is configured to composite pixel values in the first image and pixel values in the second image using the composite ratio, and wherein the compositing unit is configured to calculate a ratio based on the first edge detected by the first detecting unit, and further adds a correction value corresponding to a low-contrast region extracted by the second detecting unit to the ratio, thereby calculating the composite ratio.

14. An image processing apparatus configured to divide an image into frequency bands and reduces noise, in which a first image includes a high-band frequency component, and a second image includes a low-band frequency component, the image processing apparatus comprising:

a processor; and a memory containing instructions that, when executed by the processor, cause the processor to function as:

a first detecting unit configured to detect a first edge having a first contrast in at least one of the first image and the second image, a second detecting unit configured to detect a second edge having a second contrast lower than the first contrast in an other of the at least one of the first image and the second image, an extraction unit configured to extract a low contrast region from a third image containing a low-band frequency component lower than the low-band frequency component of the second image, and a compositing unit configured to composite the first image and the second image using a weighting corresponding to the first edge, the second edge and the low-contrast region from the third image, wherein the first contrast and the second contrast are based on a local variance of the first edge and the second edge, respectively, and wherein the first image is an input image, and the second image and the third image are images generated by performing reduction processing on the first image.

\* \* \* \* \*